US005599071A

United States Patent [19]

Kann et al.

[11] Patent Number: 5,599,071

[45] Date of Patent: Feb. 4, 1997

[54] MULTI-COMPARTMENTALIZED DUMPING BODY WITH MOVABLE FLOOR

[75] Inventors: Dirk C. Kann; Virgil L. Collins, both of Guttenberg, Iowa

[73] Assignee: Kann Manufacturing Corporation, Guttenberg, Iowa

[21] Appl. No.: 628,976

[22] Filed: Apr. 8, 1996

Related U.S. Application Data

[63] Continuation of Ser. No. 344,941, Nov. 23, 1994, abandoned.

[51] Int. Cl.$^{6}$ .......... B60P 1/28

[52] U.S. Cl. .......... 298/23 R; 414/469; 414/408; 414/486; 298/1 B; 298/8 H; 298/24; 298/29

[58] Field of Search .......... 414/406, 407, 414/408, 409, 469, 471, 486, 487; 296/683, 24.1; 105/370; 410/132, 135; 298/1 B, 8 R, 8 H, 9, 23 R, 24, 25, 29, 30, 31, 36, 22 R

[56] References Cited

U.S. PATENT DOCUMENTS

| | | | |
|---|---|---|---|
| D. 329,829 | 9/1992 | Mangino et al. | D12/15 |
| 938,012 | 10/1909 | Miller . | |
| 1,026,694 | 5/1912 | Neikirk . | |
| 1,180,292 | 4/1916 | Harris . | |
| 1,613,051 | 1/1927 | Napier . | |
| 2,255,758 | 9/1941 | Call | 214/78 |
| 2,515,334 | 7/1950 | Buye et al. | 214/82 |
| 2,772,919 | 12/1956 | Jones | 298/30 |
| 3,019,949 | 2/1962 | Allard | 222/502 |
| 3,083,849 | 4/1963 | Mottin | 214/302 |
| 3,088,383 | 5/1963 | Ekstrom | 94/46 |
| 3,161,148 | 12/1964 | Konig et al. | 105/262 |
| 3,351,384 | 11/1967 | Huck | 298/26 |
| 3,552,659 | 1/1971 | Meyer | 239/657 |
| 3,599,844 | 8/1971 | Dickson | 222/508 |
| 3,647,251 | 3/1972 | Brown et al. | 298/23 |
| 3,692,363 | 9/1972 | Tenebaum et al. | 298/24 |
| 3,709,388 | 1/1973 | Neufeldt | 214/80 |
| 3,749,445 | 7/1973 | Dalman | 298/26 |
| 3,901,552 | 8/1975 | Stone | 298/24 |
| 3,921,839 | 11/1975 | Herpich | 214/302 |
| 3,966,096 | 6/1976 | Worthington | 222/389 |
| 4,067,464 | 1/1978 | Parks et al. | 214/38 BA |
| 4,067,466 | 1/1978 | Parks et al. | 214/82 |
| 4,092,044 | 5/1978 | Hoffman | 298/27 |

(List continued on next page.)

FOREIGN PATENT DOCUMENTS

| | | | |
|---|---|---|---|
| 1264702A | 1/1990 | Canada | 414/406 |
| 0314238 | 5/1989 | European Pat. Off. . | |
| 0506057A1 | 9/1992 | European Pat. Off. . | |
| 0654424A1 | 5/1995 | European Pat. Off. . | |
| 2435100 | 2/1976 | Germany . | |
| 2914532 | 10/1979 | Germany . | |
| 1193027A | 11/1985 | U.S.S.R. | 298/23 |

OTHER PUBLICATIONS

TIMSCO, Inc. Trailer Series No author, No date.

Rogers Recycle II Commingle Body (specifications, drawings and theory of operation).

Concise Explanation of Relevance of References not in the English Language.

*Primary Examiner*—David A. Bucci
*Assistant Examiner*—Douglas Hess
*Attorney, Agent, or Firm*—Foley & Lardner

[57] ABSTRACT

A multiple compartment storage body for a refuse collection vehicle includes a floor, a roof, a plurality of walls and a partition. The plurality of walls extend between the floor and the roof and include a front wall, a rear wall, and side walls between the front wall and the rear wall. The roof, floor and walls define an interior storage space. The walls define a discharge opening. The partition extends from the front wall towards the rear wall and is positioned between the floor and the roof to divide the interior storage space into an upper compartment having a volume and a lower compartment having a volume. The partition is vertically movable so as to increase the volume of one of the upper and lower compartments in communication with the discharge opening.

27 Claims, 11 Drawing Sheets

U.S. PATENT DOCUMENTS

| | | | |
|---|---|---|---|
| 4,096,956 | 6/1978 | Gaskin | 214/82 |
| 4,103,608 | 8/1978 | Chenot | 100/53 |
| 4,113,125 | 9/1978 | Shiller | 214/302 |
| 4,242,953 | 1/1981 | St-Gelais | 100/100 |
| 4,425,070 | 1/1984 | Howells et al. | 414/498 |
| 4,840,531 | 6/1989 | Dinneen | 414/409 |
| 4,880,342 | 11/1989 | Pradovic | 410/135 |
| 4,915,570 | 4/1990 | Rath et al. | 414/409 |
| 4,954,020 | 9/1990 | Smith et al. | 406/38 |
| 4,975,205 | 12/1990 | Sloan | 210/800 |
| 4,978,271 | 12/1990 | Seader | 414/487 |
| 4,979,866 | 12/1990 | Croy | 414/517 |
| 4,981,411 | 1/1991 | Ramsey | 414/487 |
| 5,035,563 | 7/1991 | Mezey | 414/409 |
| 5,035,564 | 7/1991 | Matsumoto | 414/409 |
| 5,074,737 | 12/1991 | Pellegrini et al. | 414/406 |
| 5,078,567 | 1/1992 | Lombardo | 414/525.6 |
| 5,094,582 | 3/1992 | Molzhon | 414/406 |
| 5,116,184 | 5/1992 | Pellegrini | 414/406 |
| 5,122,025 | 6/1992 | Glomski | 414/486 |
| 5,123,801 | 6/1992 | O'Daniel | 414/525.1 |
| 5,288,196 | 2/1994 | Horning et al. | 414/407 |
| 5,316,430 | 5/1994 | Horning et al. | 414/409 |
| 5,427,496 | 6/1995 | Ratledge, Jr. et al. | 414/407 |
| 5,484,246 | 1/1996 | Horning et al. | 298/24 |

Fig. 3
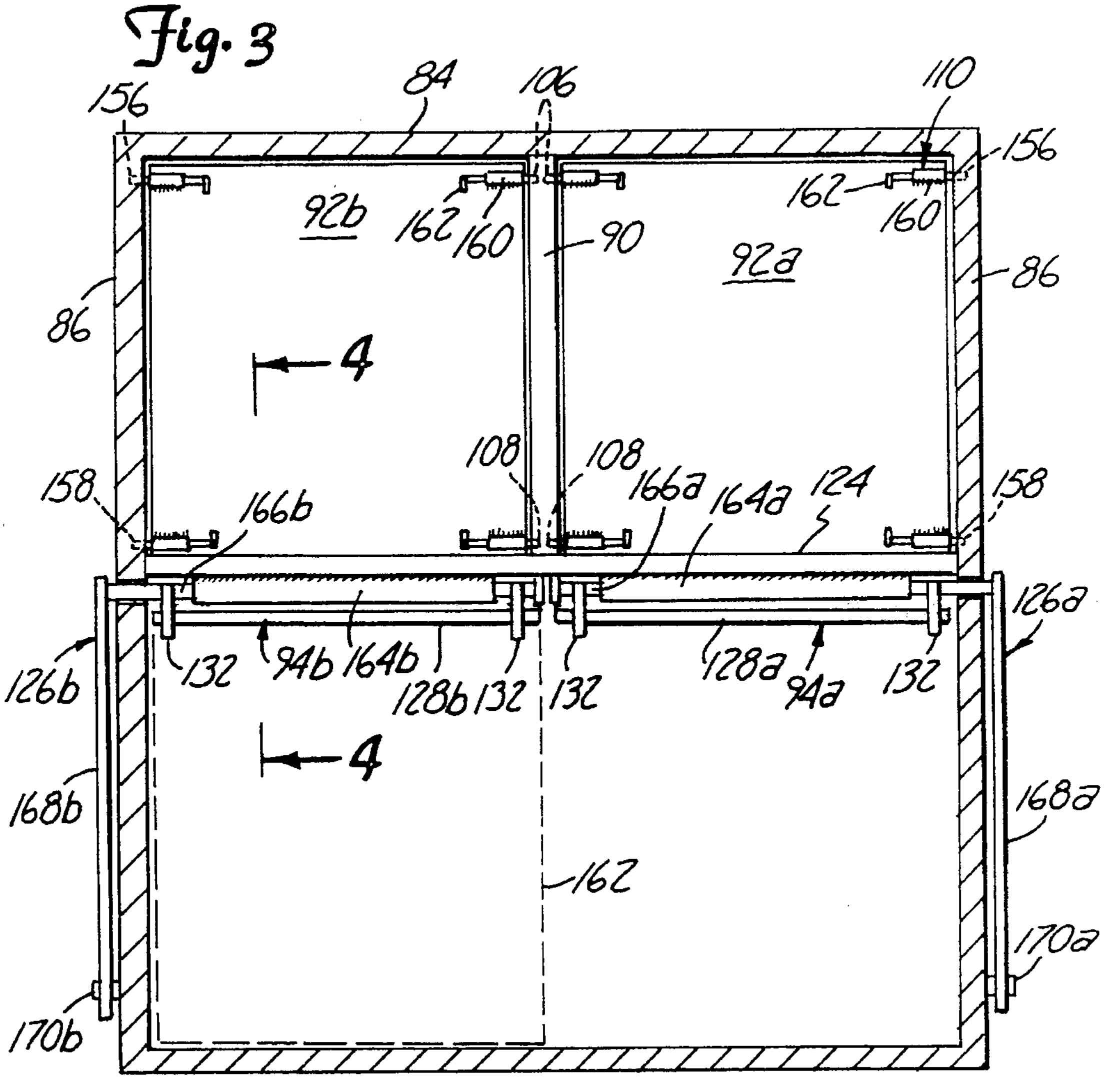
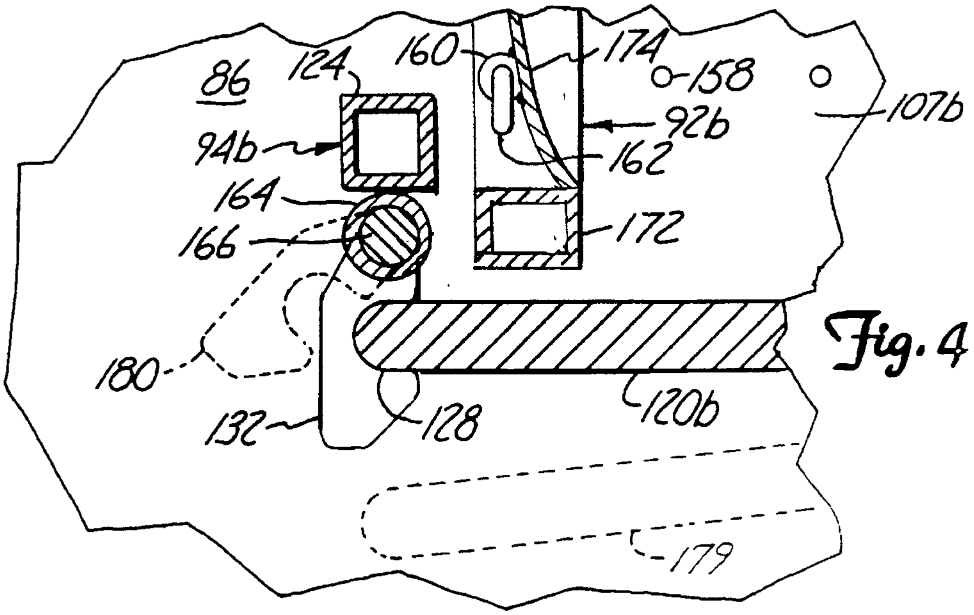
Fig. 4

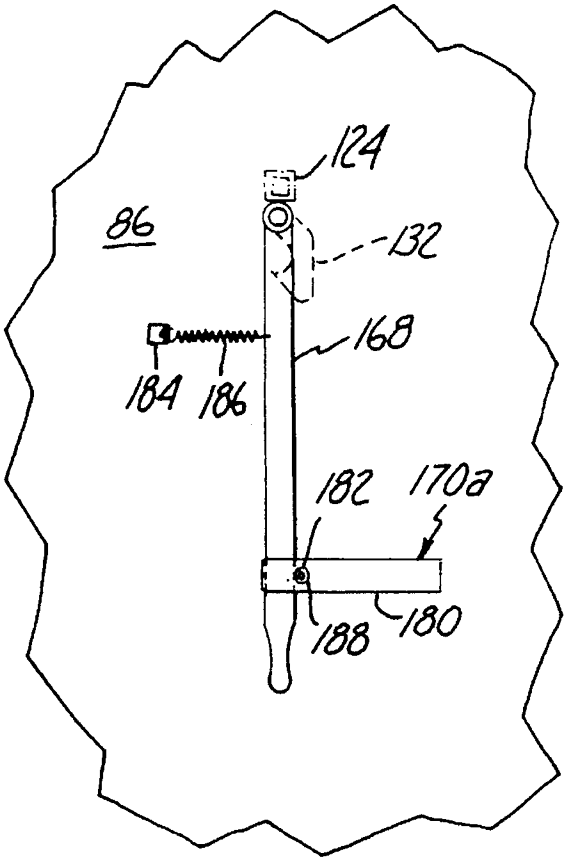
Fig.5
Fig.6
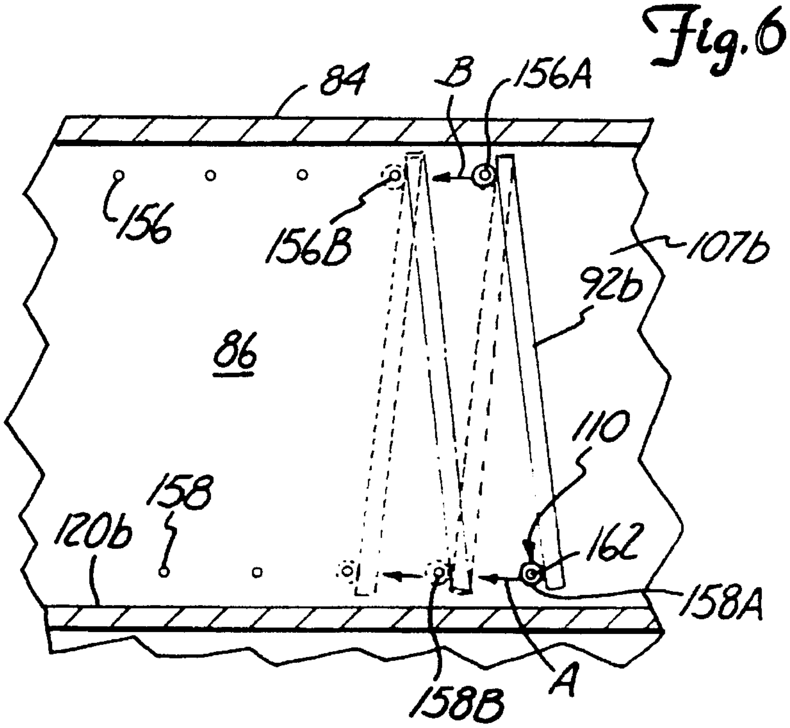

MULTI-COMPARTMENTALIZED DUMPING BODY WITH MOVABLE FLOOR

This is a continuation of application Ser. No. 08/344,941, filed Nov. 23, 1994, now abandoned

BACKGROUND OF THE INVENTION

The present invention relates to refuse vehicles for collecting and transporting garbage and recyclable materials from residences or other commercial establishments to a central disposal point such as a dump, incinerator, or recycling facility. More specifically, the present invention relates to a multiple compartment storage body having an upper compartment and a lower compartment separated by a vertically movable partition which permits the volume of either the upper or lower compartment in communication with a discharge opening to be increased for easier unloading of the refuse material.

In recent years, communities and states have developed programs for the segregation and collection of recyclable materials to minimize the consumption of natural resources and the exhaustion of landfills. In several states and communities, recycling programs have been mandated. However, vehicles intended to collect and haul waste or garbage are generally not suitable for collecting and hauling recyclable materials. Waste collecting and hauling devices and vehicles typically include a single volume or compartment in which all collected materials are stored and transported. As a result, the collected materials are co-mingled with one another in one large single compartment which is unloaded at a central disposal site.

In contrast to general garbage, recyclable commodities are preferably segregated and contained within different compartments. For example, depending upon local recycling facilities, it is often acceptable to co-mingle glass, plastic and aluminum recyclable commodities with each other. However, these three commodities must be segregated from paper and newsprint. As a result, special vehicles having multiple compartments are required for collecting recyclable commodities. Because the amount of each commodity may vary from day to day or from site to site, it is also advantageous to provide compartments which have adjustable volumes to provide variable capacities for containing the commodities. Although the multiple compartments allow different commodities to be separated, compartmentalization also reduces the storage volume of the storage body. In addition, because of the increased number of walls and corners within the individual compartments, less material may be compacted and contained within the interior volume of the storage body. As a result, multiple compartment storage bodies designed for the collection and segregation of recyclable materials are not economical and well suited for the collection of unrecyclable garbage which does not need to be segregated. Consequently, communities may be required to own and operate separate vehicles, a single compartment garbage truck for the sole collection of garbage from one locality and a multiple compartment vehicle for the collection of recyclables and refuse from a different locality. Maintaining and operating separate vehicles for these different functions is costly.

As refuse is filled within each compartment of multiple compartment vehicles, the refuse tends to become compacted. Moreover, to increase the mass of materials which may be carried and transported within the storage body, refuse vehicles typically include rams or compactors for further compacting the refuse within the individual compartments. As the number of compartments within the storage body increase, the need for further compacting the refuse material also increases. Compaction of the refuse materials permits larger amounts of refuse material to be contained within the storage body, thereby reducing the number of trips and the total cost associated with collecting the refuse. However, compaction of the refuse material within the storage body also makes unloading the refuse from the vehicle more difficult. As a result, compacted refuse within the storage body must be loosened and uncompacted so that the material may be dumped or pushed from the storage body. Loosening the compacted refuse or recyclable material requires additional time and tools and increases the cost of operating the refuse collection vehicle.

Unloading the compacted refuse from the storage body is further complicated in storage bodies having hopper discharge openings which narrow towards the opening. Because these discharge openings are generally funnel shaped, compacted refuse material within the storage body actually becomes more compacted as the material approaches the opening. As a result, storage bodies utilizing hopper-shaped discharge openings as part of the floor of the storage body are especially difficult to unload.

SUMMARY OF THE INVENTION

The present invention is an improved multiple compartment storage body for a refuse collection vehicle. The body includes a floor, a roof, a plurality of walls and a partition. The plurality of walls extend between the floor and the roof and include a front wall, a rear wall and side walls between the front wall and the rear wall. Together, the roof, floor and walls define an interior storage space. The walls define a discharge opening. The partition extends from the front wall to the rear wall and is positioned between the floor and the roof to divide the interior storage space into an upper compartment having a volume and a lower compartment having a volume. The partition is vertically movable so as to increase the volume of one of the upper and lower compartments in communication with the discharge opening. In use discharging refuse from such a storage body involves discharging refuse from the lower storage compartment out the discharge opening, lowering the partition to increase the volume of the upper storage compartment in communication with the discharge opening, and discharging refuse from the upper storage compartment out the discharge opening. As a result, refuse or other material stored and compacted within the compartments is more easily unloaded.

BRIEF DESCRIPTION OF THE DRAWINGS

FIG. 3 is a sectional view as taken along lines 3—3 of FIG. 1.

FIG. 4 is an enlarged fragmentary sectional view as taken along lines 4—4 of FIG. 3.

FIG. 5 is a fragmentary side elevational view of a portion of the storage body of the refuse collection vehicle of FIG. 1, showing a locking/release mechanism.

FIG. 6 is a sectional view of a portion of the storage body of FIG. 1 illustrating adjustable positioning of bulkheads within the storage body.

DETAILED DESCRIPTION OF THE PREFERRED EMBODIMENTS

Throughout the specification of the application, various terms are used such as "top", "bottom", "front", "rear", "left", "right", and the like. These terms denote directions with respect to the drawings and are not limitations of orientation of the present invention. Rather, these terms are provided for clarity in describing the relationship between members and compartments of the refuse collection vehicle. For example, the terms "right" and "left" are used in describing relationships between elements when viewed from the rear end of the refuse collection vehicle.

Figure 1:
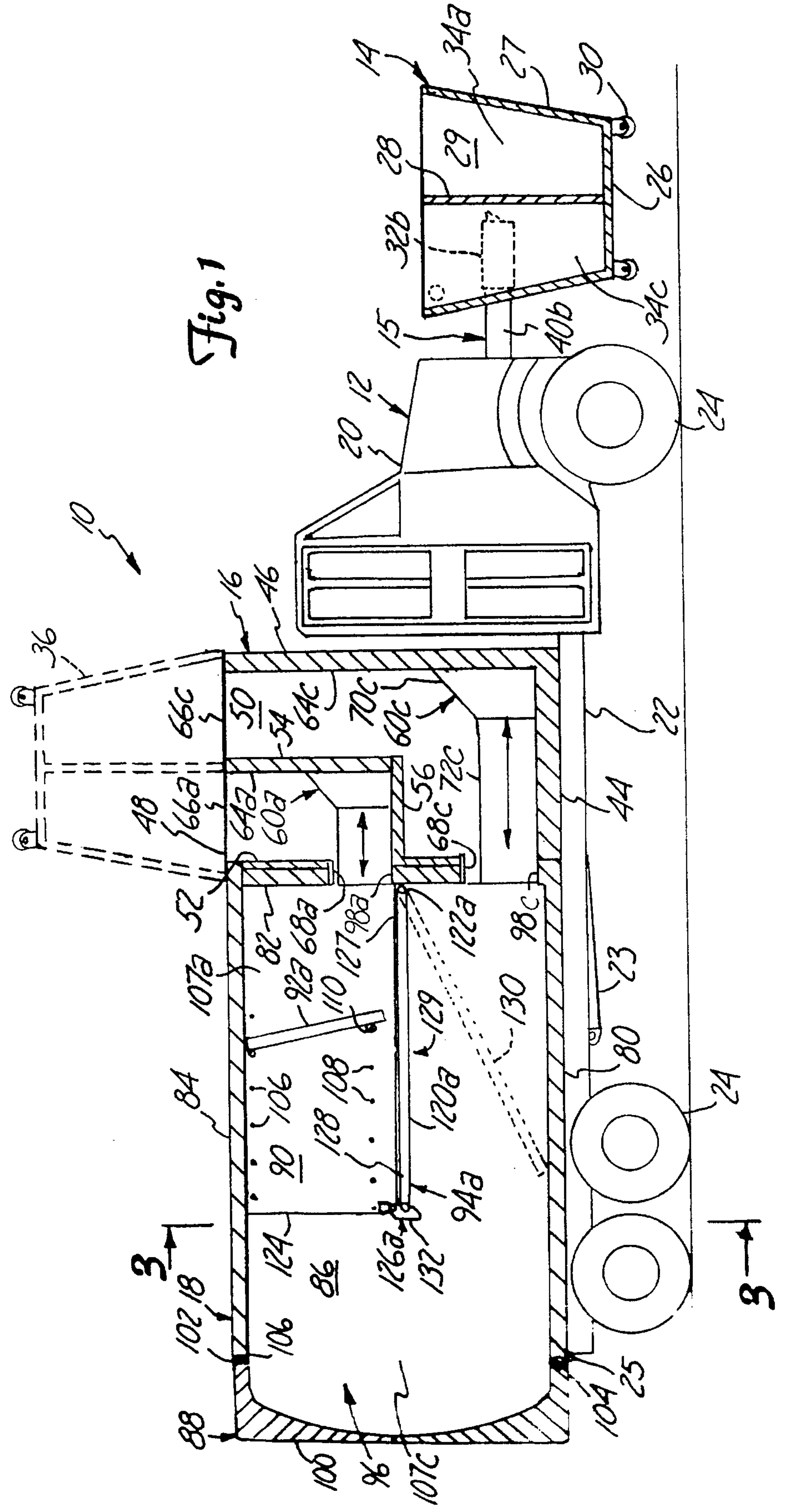
FIG. 1 is a side elevational view of a refuse collection vehicle, with portions shown in section.

As seen in FIG. 1, refuse collection vehicle 10 generally includes chassis 12, loading trough or bin 14, lifting apparatus 15, compactor 16 and storage body 18. Chassis 12 may have a variety of configurations depending upon the configurations of loading bin 14, compactor 16 and the storage body 18 being used. Chassis 12 supports and transports compactor 16 and storage body 18 between material pick up and disposal sites. Chassis 12 further lifts and tips storage body 18 to unload refuse from storage body 18 and includes cab 20, frame 22, lifting jack 23 and wheels 24. Cab 20 is positioned forward of compactor 16 and storage body 18. Cab 20 houses an engine, drive train and vehicle controls of vehicle 10. Frame 22 extends rearwardly from cab 20 and provides a base for supporting compactor 16 and storage body 18. Preferably, frame 22 is pivotally coupled to compactor 16 and storage body 18 at pivot 25.

Lifting jack 23 preferably is a hydraulic piston-cylinder assembly as is conventionally used for tipping or lifting storage bodies in grain and refuse vehicles. Lifting jack 23 is mounted between frame 22 and compactor 16 in storage body 18 towards a front end of chassis 12. Lifting jack 23 lifts and tips compactor 16 and storage body 18 near a front end of chassis 12 about pivot 25 so that refuse may be unloaded from a rear end of storage body 18. Alternatively, lifting jack 23 may be mounted between frame 22 and a side of either compactor 16 or storage body 18 for tipping the storage body 18 to one side to discharge refuse out a side discharge opening. As can be appreciated, lifting jack 23 may alternatively employ pneumatic or other means for tipping compactor 16 and storage body 18. Wheels 24 are rotatably mounted to cab 20 and frame 22 to support cab 20 and frame 22 above the surface.

Figure 2:
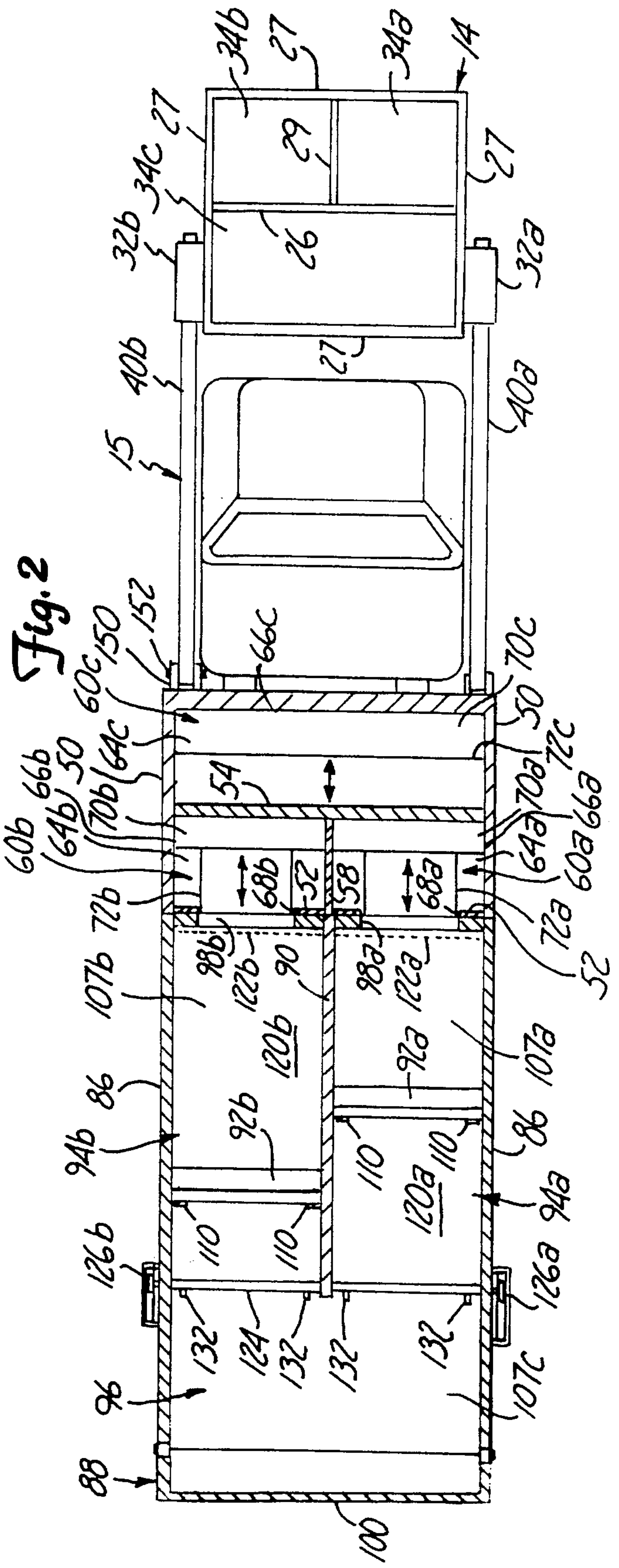
FIG. 2 is a top view of the refuse collection vehicle of FIG. 1, with portions shown in section.

Loading bin 14 is a generally rectangular cart or dumpster including a bottom floor 26, a plurality of exterior side walls 27, interior dividing walls 28,29, rollers 30 and lifting lugs 3*a* (as shown in FIG. 2) and 32*b*. Floor 26 and exterior walls 27 define a storage capacity or volume for loading bin 14. Dividing wall 28 extends between floor 26 and exterior walls 27 to divide the storage volume of loading bin 14 into a front half and a back half. Dividing wall 29 extends from dividing wall 28 to the forward end of exterior walls 27 to divide the remaining front half of loading bin 14 into two side-by-side compartments. Overall, dividing walls 28 and 29 in conjunction with floor 26 and exterior wall 27 define three distinct compartments, front right compartment 34*a*, front left compartment 34*b* (shown in FIG. 2) and rear compartment 34*c*. Each compartment 34 is sized and designed for the reception of garbage and recyclable materials which must be separated. Preferably, rear compartment 34*c* extends along an entire rear half of loading bin 14 for reception of generally non-recyclable garbage. Front right compartment 34*a* and front left compartment 34*b* divide the remaining front half of loading bin 14 for the reception of paper and glass or plastic material, respectively.

Rollers 30 extend downward from floor 26 of bin 14 and support bin 14 above the surface. Rollers 30 permit bin 14 to be detached from vehicle 10 for movement to otherwise inexcessible loading and fill stations. Lifting lugs 32*a*, 32*b* are preferably cylindrical or tubular shaped and sized for receiving an engaging member of lifting apparatus 15.

Lifting lugs 32*a*, 32*b* are mounted beside portions of exterior walls 27. Preferably, lifting lugs 32*a*, 32*b* are located towards a rear portion of loading bin 14. Lifting lugs 32*a*, 32*b* permit loading pin 14 to be releasably engaged by lifting apparatus 15 so that loading bin 14 may be lifted above compactor 16 and unloaded into compactor 16 as shown by phantom lines 36. Alternatively, loading bin 14 may comprise side-loading bins secured to one or both sides of compactor 16 wherein the compartments are preferably lifted along and adjacent to sides of compactor 16 until above compactor 16 where bin 14 is tipped to dispense the materials from the compartments into compactor 16. As can be appreciated, bin 14 may alternatively be fixedly attached to lifting apparatus 15.

Lifting apparatus 15 lifts the contents of loading bin 14 above compactor 16 to unload the contents of loading bin 14 into compactor 16 as shown by phantom lines 36. As shown in FIG. 2, lifting apparatus 15 preferably includes a pair of lifting arms or forks 40*a* and 40*b* which pivotally extend in front of cab 20. Forks 40*a*, 40*b* engage and couple with lifting lugs 32*a*, 32*b*. Forks 40*a*, 40*b* are lifted by power devices, preferably hydraulic piston/cylinder assemblies which are hydraulically controlled by control means within cab 20 as is conventionally known in the art. In operation, refuse collection vehicle 10 is driven up to loading bin 14 so that forks 40*a*, 40*b* engage lifting lugs 32*a* and 32*b*. The power device is then used to lift forks 40*a*, 40*b* and loading bin 14 upward and rearward of cab 20 as shown by phantom lines 36 to empty the contents of compartments 34 into compactor 16.

Compactor 16 is mounted to frame 22 between storage body 18 and cab 20 and includes floor 44, front wall 46, roof 48, side walls 50 (shown in FIG. 2), rear wall 52, forward chute partitioning wall 54, upper chute floor 56, intermediate chute wall 58, and ram assemblies 60*a*, 60*b* (shown in FIG. 2) and 60*c*. Floor 44, front wall 46, roof 48, side walls 50 and rear wall 52 house and define compactor 16. Forward chute wall 54 extends downward from roof 48 between side walls 50. Upper chute floor 56 horizontally extends from rear wall 58 to a lower end of forward chute partitioning wall 54. Intermediate chute wall 58 vertically extends between rear wall 52 and forward chute wall 54, from roof 48 to floor 56, intermediate side walls 50. Forward chute wall 54, upper chute floor 56 and intermediate chute wall 58 divide compactor 16 into three compaction compartments or chutes 64, rear right compaction chute 64*a*, rear left compaction chute 64*b* (shown in FIG. 2) and forward compaction chute 64*c*. Roof 48 includes openings 66*a*, 66*a* (shown in FIG. 2) and 66*a* which communicate with chutes 64*a*, 64*b* and 64*c*, respectively. Rear wall 58 also includes openings 68*a*, 68*b* (shown in FIG. 2) and 68*b* in communication with a lower end of chutes 64*a*, 64*b* and 64*c*, respectively. Opening 68*c* is preferably adjacent floor 50 while opening 68*a* and 68*b* are adjacent floor 62 so that openings 68*a*, 68*b* and 68*b* are in alignment with ram assemblies 60*a*, 60*b* and 60*c*, respectively.

Ram assemblies 60*a*, 60*b* and 60*c* (schematically shown) are conventionally known in the field and are provided for pushing and compacting waste and recyclable materials in a pre-selected direction. Ram assembly 60*c* is positioned toward a lower end of chute 64*c* and includes cover plate 70*c* and ram 72*c*. Cover plate 72*c* extends between side walls 50 and is slightly inclined downwardly and rearwardly. Cover plate 70*c* houses and protects ram 72*c* while channeling waste and recyclables forwardly of ram 72*c* when ram 72*c* is in a retracted position. Ram 72*c*, which is schematically shown, is well-known in the art. Ram 72*c* extends from below cover plate 70*c* within chute 64*c* adjacent floor 44 to rear wall 52. In a typical arrangement, ram 72*c* includes a fluid actuated piston and cylinder assembly wherein the piston is coupled to a front blade of the ram to move the ram rearward. Ram 72*c* is preferably controlled through pneumatic or electrical control means which form cab 20 which actuates ram 72*c*. Ram 72*c* pushes waste and recyclables within chute 64*c* out opening 68*c* into storage body 18. As can be appreciated, ram 72*c* may alternatively be configured such that ram 72*c* may be extended rearwardly beyond rear wall 52 into storage body 18 to further compact waste and recyclable material. Ram assemblies 60*a* and 60*b* are similar to ram assembly 60*c* but are positioned within lower ends of chutes 64*a* and 64*b*, respectively.

Storage body 18 is mounted to frame 22 adjacent rear wall 44 of compactor 16 and includes floor 80, front wall 82, roof 84, side walls 86, tailgate assembly 88, intermediate dividing wall 90, movable bulkheads 92*a* and 92*b* (shown in FIG. 2) and drop floor assemblies 94*a* and 94*b* (shown in FIG. 2). Floor 80, front wall 82, roof 84, side walls 86 and tailgate assembly 88 define interior storage space 96 of storage body 18. Front wall 82 includes upper right opening 98*a*, upper left opening 98*b* (shown in FIG. 2), and lower opening 98*c*. Openings 98*a*, 98*b* and 98*c* are in communication with and preferably aligned with openings 68*a*, 68*b* and 68*c*, respectively so that ram assemblies 66*a*, 66*b* and 66*c* may push and compact waste and recyclables through their respective aligned openings into interior storage space 96. Although sidewalls 86 are shown as being linear from floor 80 to roof 84, sidewalls 86 may alternatively be curved or bowed outwardly between floor 80 and roof 84.

Tailgate assembly 88 includes wall 100 which has a curved inner surface. Wall 100 is pivoted to roof 84 and side walls 86 about pivot 102 and releasably latched to floor 80 and side walls 86 at latch 104. Wall 100 encloses the rear portion of interior storage space 96 to retain waste and recyclable commodities within interior storage space 96. Hinge 102 and latch 104 permit wall 100 to be lifted to thereby open and define a discharge opening 106 through which the commodities may be emptied from interior storage space 96. Preferably, tailgate assembly 88 is hydraulically operated to lift wall 100 and to open discharge opening 106. Because wall 100 has a curved inner surface, waste and recyclable commodities pushed rearward by ram 72*c* are lifted along wall 100 to spaces above drop floor assemblies 94. Alternatively, wall 100 vertically extends between floor 80 and roof 84 and additionally includes a plate extending between side walls 86 and slanting downward and forwardly (to the right as viewed in FIG. 1) from wall 100 towards floor 80 so that material pushed rearward by ram 72*c* is lifted above drop floor assemblies 94.

Intermediate dividing wall 90 extends downward from roof 84 and rearward from front wall 82 to divide upper and forward portions of storage space 96 into left and right halves. Intermediate dividing wall 90, movable bulkheads 92*a*, 92*b* and drop floor assemblies 94*a*, 94*b* divide storage space 96 into three separate distinct compartments (upper right compartment 107*a*, upper left compartment 107*b* (shown in FIG. 2), and central compartment 107*c*). As a result, each compartment is used to contain and separate different commodities.

Divider wall 90 is preferably positioned in alignment with intermediate chute wall 58 between openings 66*a*, 98*a* and 66*b*, 98*b*. Divider wall 90 includes positioning detents 106, 108. Positioning detents 106 extend through or at least partially into dividing wall 90 at selectively spaced positions along a top edge of divider wall 90. Positioning detents 108 extend through or at least partially into dividing wall 90 at selectively spaced positions along a bottom edge of divider wall 90. In the preferred embodiment, positioning detents 106 are spaced 6 inches apart from one another and positioning detents 108 are spaced 6 inches apart from one another. The spacing between detents 106 is preferably offset 3 inches from the spacing of detents 108 so that each detent 106 is longitudinally located 3 inches from adjacent corresponding detents 108. Similarly, corresponding positioning holes are provided opposite positioning detents 106, 108 adjacent side walls 86. As explained in greater detail later, positioning detents 106, 108 and the holes within the side walls 86 allow movable bulkheads 92*a* and 92*b* to be selectively positioned at various locations along the longitudinal length of storage space 96 to adjust the length and thereby the volume of upper storage compartments 107*a* and 107*b*.

Movable bulkheads 92*a* and 92*b* are located on opposite sides of divider wall 90. Movable bulkhead 92*a* is located on the right side of divider wall 90 and movable bulkhead 92*b* is on the left side of divider wall 90. Movable bulkheads 92*a* and 92*b* each preferably comprise a square tubular frame having a sheet of sheet steel welded in place within the frame. Alternatively, bulkheads 92*a* and 92*b* may be made of rigid high strength plastics which are lighter weight than sheet steel. Each movable bulkhead 92*a*, 92*b* further includes positioning members 110 located at each of the four corners on a rear surface of movable bulkheads 92*a*, 92*b*. Positioning members 110 are sized and carried so as to engage corresponding positioning detents 106, 108 within divider wall 92 and similar positioning holes adjacent side walls 86. As a result, bulkheads 92*a* and 92*b* may be positioned forwardly and rearwardly to decrease or enlarge the volumetric capacity of compartments 107*a* and 107*b*, respectively. Because detents 106, 108 are provided on divider wall 90 and because similar aligned corresponding holes are provided adjacent side walls 86, bulkheads 92*a*, 92*b* are independently supported and movable with respect to drop floor assemblies 94*a*, 94*b*.

Drop floor assemblies 94*a* and 94*b* are preferably positioned on opposite sides of divider wall 90 and include horizontal partitions or floor panels 120*a*, 120*b* (shown in FIG. 2), hinges 122*a*, 122*b* (shown in FIG. 2), hook latch support cross tube 124 and hook latches 126*a*, 126*b*. Floor panels 120*a*, 120*b* are generally flat, rectangular sheets of sheet steel which act as floors for compartments 107*a*, 107*b*, respectively. Alternatively, floor panels 120*a*, 120*b* may be formed from rigid high strength plastics which are lighter in weight than sheet steel. Floor panels 120*a*, 120*b* each include opposing edge portions 127, 128. Edge portion 127 of each panel 120*a*, 120*b* is preferably tubular and is pivotally coupled to front wall 82 by hinges 122*a*, 122*b*, respectively.

Edge portion 128 of each floor panel 120*a*, 120*b* is located opposite edge portion 127 and pivots between a raised position 129 and a lowered position 130 (shown by dashed lines). In the raised position 129, edge portion 128 of either or both floor panels 120*a*, 120*b* is releasably supported by hook latch support cross tube 124 and hook latches 126*a*, 126*b*. Hinges 122*a* and 122*b* (shown in FIG. 2) extend through and engage the edge portion 127 of each floor panel 120*a*, 120*b*. Hinges 122*a*, 122*b* permit floor panels 120*a*, 120*b* to be vertically moved or pivoted so as to increase the volume of compartments 107*a*, 107*b*, respectively, in communication with discharge opening 106. In embodiments where storage body 18 includes curved or bowed outward sidewalls 86, hinges 122*a*, 122*b* are preferably slanted downward from the center so that floor panels 122*a*, 122*b* fall to floor 80 with adequate clearance. Consequently, floor panels 120*a*, 120*b* are also slightly slanted downward from the center of storage body 18. In addition, because floor panels 120*a*, 120*b* are vertically movable, movable bulkheads 92*a*, 92*b*, once positioned, may be left in position and do not need to be taken out or moved to discharge commodities from compartments 107*a*, 107*b*. Because the volume of compartments 107*a*, 107*b* in communication with discharge opening 106 may be increased, waste and recyclable commodities within compartments 107*a*, 107*b* are less compacted and are easier to unload. Because the resulting flow path between upper and lower compartments does not narrow, commodities do not become more compacted as they fall into the lower compartment. Moreover, because the entire floor may be vertically moved to some extent, there are no horizontal portions or corners to prevent commodities from falling into lower compartments and to prevent the commodities from being completely unloaded out of the upper compartments. As can be appreciated, other mechanisms may alternatively be provided for vertically raising and lowering floor panels 120*a*, 120*b*. For example, rather than relying upon the force of gravity, floor panels 120*a*, 120*b* could be mechanically, hydraulically or pneumatically raised and lowered about hinges 122*a*, 122*b* or by raising and lowering the entire floor panels 120*a*, 120*b* so that both opposing sides of the floor panels are lowered while being guided within channels or grooves provided on the side walls 86 and dividing wall 90. In addition, the location of hinges 122*a*, 122*b* may be varied. For example, floor panels 120*a*, 120*b* alternatively may be hinged to side walls 86 such that floor panels 120*a*, 120*b* fall or drop to positions adjacent and parallel to side walls 86.

Hook latch support cross tube 124 extends between side walls 86 and provides a support structure for supporting hook latches 126*a*, 126*b* and ultimately edge portions 128 of floor panels 120*a*, 120*b*.

Hook latches 126*a*, 126*b* (shown in FIG. 2) are pivotally coupled to the lower end of support cross tube 124. Each hook latch 126*a*, 126*b* includes at least a pair of latches or hooks 132 for engaging tubular ends 128 of floor panels 120*a*, 120*b*. Hooks 132 support floor panels 120*a*, 120*b* in a raised position so that compartments 107*a*, 107*b* are separated from compartment 107*c*. Once 107*c* is emptied, hooks 132 may be rotated (clockwise as seen in FIG. 4) to release either or both floor panels 120*a*, 120*b* so that edge portion 128 of the released floor panel drops to the lowered position 130 (shown by dashed lines in FIG. 1) by the action of gravity for unloading commodities from the above compartment.

During unloading storage body 18 and compactor 16, the forward end of storage body 18 is lifted so as to tip storage body 18. As a result, tubular end 128 of either or both floor panels 120*a*, 120*b* pivot about hinges 122*a*, 122*b* away from floor 80 and towards hooks 132. When storage body 18 is tipped into a vertical or near vertical position, tubular end 128 of either or both floor panels 120*a*, 120*b* naturally repositions itself adjacent hooks 132 by the action of gravity. Thus, repositioning floor panels 120*a*, 120*b* simply requires that hooks 132 be rotated counterclockwise so as to re-engage tubular ends 130 of floor panels 120*a*, 120*b*. Once storage body 18 is lowered into a normal horizontal position, hooks 132 once again support floor panels 120*a*, 120*b*. Consequently, expensive and space consuming hydraulic or pneumatic lifting mechanisms are not necessary to reposition floor panels 120*a*, 120*b* in a raised position.

As shown by FIG. 2, compartments 34*a*, 34*b* and 34*c* of loading bin 14 are each positioned so as to unload or dump into compactor chutes 64*a*, 64*b* and 64*c*, respectively, when bin 14 is lifted above compactor 16 by lifting apparatus 15. Arms or forks 40*a* and 40*b* are pivotally connected or hinged from compactor 16 by lugs 150 and bolts 152 at a first end of forks 40*a*, 40*b*. The opposite, second end of forks 40*a*, 40*b* are spaced apart from one another as to engage lifting lugs 32*a*, 32*b* of loading bin 14. Once engaged to loading bin 14, lifting apparatus 15 is hydraulically or pneumatically actuated to lift loading bin 14 above compactor 16 to empty commodities into compactor 16.

As best shown in FIG. 2, upper compactor chutes 64*a* and 64*b* open into upper compartments 107*a* and 107*b*, respectively, through openings 68*a*, 98*a* and 68*b*, 98*b*. Rams 72*a* and 72*b* are accordingly positioned for pressing or compacting commodities dumped from compartments 30*a*, 30*b* within loading bin 14 through chutes 76*a*, 76*b* into compartments 107*a* and 107*b* within storage body 18.

FIGS. 3 and 4 illustrate movable bulkheads 92*a*, 92*b* and drop floor assemblies 94*a*, 94*b* in much greater detail. As shown by FIG. 3, side walls 86 include holes or detents 156, 158. Detents 156, 158 are spaced in direct alignment with corresponding positioning detents 106, 108, respectively, within dividing wall 90 so that movable bulkheads 92*a*, 92*b* may be securely, but releasably, bolted in a selected position with positioning members 110 at various locations along and between side walls 86 and divider wall 90 to adjust the volume of each of the two upper compartments.

Positioning members 110 are located at each of four corners of movable bulkheads 92*a* and 92*b* and include guides 160 and positioning bolts 162. Guides 160 are preferably cylindrical tubes fixedly mounted at each of the four corners of each movable bulkhead 92*a*, 92*b*. Each guide 160 has an inner diameter in alignment with an adjacent detent and is sized for receiving and carrying a positioning bolt 162. Positioning bolts 162 are slidably received within guides 160 so that one end of each bolt 162 engages a detent to secure and position the movable bulkhead. At the same time, bolts 162 may be retracted from the detent for repositioning of movable bulkheads 92*a*, 92*b*. As can be appreciated, positioning bolts 162 may alternatively be threadably received within guides 160 and may also be spring biased into engagement with corresponding detents. In addition, an interconnecting linkage or cable may also be provided between members 110 that are adjacent walls 90 and 86 to permit manual actuation of both members 110 at the same time and to allow easier adjustment of bulkheads 92*a*, 92*b*.

As further shown by FIG. 3, hook latches 126*a* and 126*b* each include a guide tube 164, latch shaft 166, lever arm 168 and lever guide and lock 170. Guide tubes 164 are fixedly secured to a lower end of latch support tube 124. Guide tubes 164 receive and guide the rotation of latch shafts 166. Latch shafts 166 are elongate cylindrical rods which extend through and rotate within guide tubes 164 and which carry hooks 132 for hooking and releasing ends 128 of floor panels 120. Preferably, latch shaft 166 projects from guide tube 164 at opposite ends of guide tube 164. Each end of latch shaft 166 which projects out from guide tube 164 carries a hook 132. Consequently each latch shaft carries two hooks 132 for engaging edge portion 128 of floor panel 120. As can be appreciated, guide tubes 164 and latch shafts 166 may be modified to carry and support any desired number of hooks 132. Latch shafts 166 extend through side walls 86 and are coupled to lever arms 168.

Lever arms 168 have a first end secured to latch shafts 166 and a second opposite end engaged within lever guide and lock 170. Lever arms 168 enable latch shaft 166 and hooks 132 to be manually rotated outside of side walls 86 to latch either or both floor panels 120*a*, 120*b* in a raised position as shown or to release either or both floor panels 120*a*, 120*b* as shown by dashed lines. Alternatively, hydraulic, pneumatic or other known power mechanisms may be employed to rotate latch shaft 166 and hooks 132 for releasing and latching floor panels 120*a*, 120*b*.

Lever guide and locks 170*a*, 170*b* are shown in detail in FIG. 5 and generally define a track for moving and guiding lever arm 158. Locks 160*a*, 106*b* further include a locking mechanism (not shown) for locking lever arm 168 in a secured position whereby hook 132 is also locked in the selected position to prevent hook 132 from rotating and accidentally releasing floor panel 120.

FIG. 4 shows an enlarged fragmentary cross-sectional view of a portion of drop floor assembly 94*b* and movable bulkhead 92*b*. As shown by FIG. 4, movable bulkhead 92*b*, as well as movable bulkhead 92*a* (not shown), include a rectangular frame 172 formed by rectangular metal tubing, and plate 174, which carry guides 160 and positioning bolts 162. Plate 174 is preferably formed from eleven gauge sheet steel and is preferably welded to edges of rectangular frame 172. Frame 172 provides a rigid structure for supporting plate 174 which contains recyclable and waste commodities within compartments 107*a*, 107*b*. As discussed above, positioning bolts 162 are carried and guided by guides 160. Bolts 162 extend through frame 172 and engage positioning holes 156, 158 in side walls 86 as well as positioning detents 106, 108 in divider wall 90 (as shown in FIG. 3). Positioning bolts 162 may be disengaged from the positioning detents 106, 108, 156, 158 and reengaged in an adjacent positioning hole to reposition the movable bulkhead. Accordingly, movable bulkheads 92*a* and 92*b* are spaced from roof 84 and floor panels 120 to enable the movable bulkheads 92 to be walked longitudinally between side walls 86 and wall 90 as explained later with respect to FIG. 6.

FIG. 4 also shows drop floor assembly 94*b* in greater detail. As best shown in FIG. 4, guide tube 164 is preferably welded to a lower surface of hook latch support cross tube 124. Guide tube 164 is a hollow tubular member which has an inner diameter sized for receiving and guiding latch shaft 166. Latch shaft 166 is rotatably disposed within guide tube 164 so that latch shaft 166 is ultimately supported by support cross tube 124. Portions of latch shaft 166 extend out from guide tube 164 and carry hooks 132. Hooks 132 engage edge portion 128 of floor panels 120 to releasably support floor panels 120 in a generally horizontal orientation below movable bulkheads 92. As shown by dashed lines 179, latch shaft 166 may be rotated within guide tube 164 so as to rotate hook 132 out of engagement with edge portion 128 of floor panel 120*b*. Consequently, floor panel 120*b* is released and is permitted to fall due to force of gravity. Once commodities are unloaded from compartment 107*b*, floor panel 120*b* may once again be relatched by hook 132 in its original position.

FIG. 5 is a side elevational view of a portion of storage body 18 illustrating lever guide and lock 170*a*. For ease of illustration, only lever guide and lock 170*a* is shown in detail since lever guide and lock 170*b* is identical to lever guide and lock 170*a*. Lever guide and lock 170*a* includes guard 180, quick release pin 182, angle bracket 184, and spring 186. Guard 180 is a pair of spaced apart generally flat elongate bars having ends fixedly secured to side wall 86. Guard 180 provides a channel or track between guide 180 and side wall 86 for guiding movement of lever arm 168. Guard 180 is preferably secured to side wall 86 so as to partially surround a lower end of lever arm 168. Guide 180 further defines a pair of aligned apertures 188 which extend through both spaced apart bars forming guard 180. Apertures 188 are sized for receiving quick release pin 182. Quick release pin 182 is conventionally known and is received within apertures 188 to prevent movement of lever arm 168 within the track defined by guard 180. As a result, hooks 132 of hook latches 126*a* are also secured in position and cannot be rotated. Manual release of release pin 188 permits movement of lever arm 168 and rotation of hooks 132 to release floor panel 120*a*.

Angle bracket 184 is fixedly secured to side wall 86 and captures a first end of spring 186. The second end of spring 186 is coupled to lever arm 168. Spring 186 biases lever arm 168 in a first position whereby hook 132 is engaged with floor panel 120*a* (not shown). As a result, accidental release of floor panel 120*a* is prevented by both the biasing force of spring 186 and release pin 188. At the same time, removal of release pin 188 permits lever arm 186 to be moved against the biasing force of spring 186 to release floor panel 120*a* (not shown).

FIG. 6 illustrates in greater detail the lengthwise adjusting or walking of bulkheads 92 between the front and rear of storage body 18 to adjust the volume of compartments 107*a*, 107*b*. For ease of illustration, FIG. 6 shows repositioning of movable bulkhead 92*b* to adjust the volume of compartment 107*b*. As can be appreciated, repositioning of movable bulkhead 92*a* to adjust the volume of 107*a* is accomplished similarly. As shown by FIG. 6, the row of detents 156 and the row of detents 158 in side walls 86 are offset from one another by one-half the distance separating adjacent detents of either row 156 or 158. In the preferred embodiment, each detent 156 is spaced from an adjacent detent 156 by about 6 inches. Each detent 158 is spaced from an adjacent detent 158 by about 6 inches. Accordingly, the row of detents 156 and 158 are offset by about 3 inches from one another so that each detent 158 is positioned between adjacent detents 156. The row of detents 156 longitudinally extends just below roof 84. The row of detents 158 longitudinally extends just above the horizontal position of floor panel 120*b*. Movable bulkhead 92*b* has a top edge spaced from roof 84 and a bottom edge spaced above floor panel 120*b* so that movable bulkhead 92*b* may be pivoted about detents 156 and 158 as shown in FIG. 6.

As shown by dashed lines, movable bulkhead 92*b* is repositioned to increase the volume of compartment 107*b* by pivoting the lower end of bulkhead 92*b* about detent 156A as indicated by arrow A. Next, positioning bolt 162 adjacent the lower end of movable bulkhead 92*b* is positioned so as to engage detent 158B and positioning bolt 162 adjacent the top end of the movable bulkhead 92*b* is disengaged from detent 156*a* to enable the top end of movable bulkhead 92*b* to be pivoted about detent 158B and pivoted as shown by arrow B. This procedure may be repeated as necessary to reposition movable bulkhead 92*b* in a desired position and to selectively adjust the volume of compartment 107*b*. Movable bulkhead 92*b* is positioned manually without complex guiding or alignment mechanisms. Thus, it is easy to reposition bulkhead 92*b* without bulkhead 92*b* becoming jammed or bound within guiding structures. Furthermore, because tolerance concerns are eliminated with respect to bulkhead 92*b*, manufacture is less costly.

Figure 7:
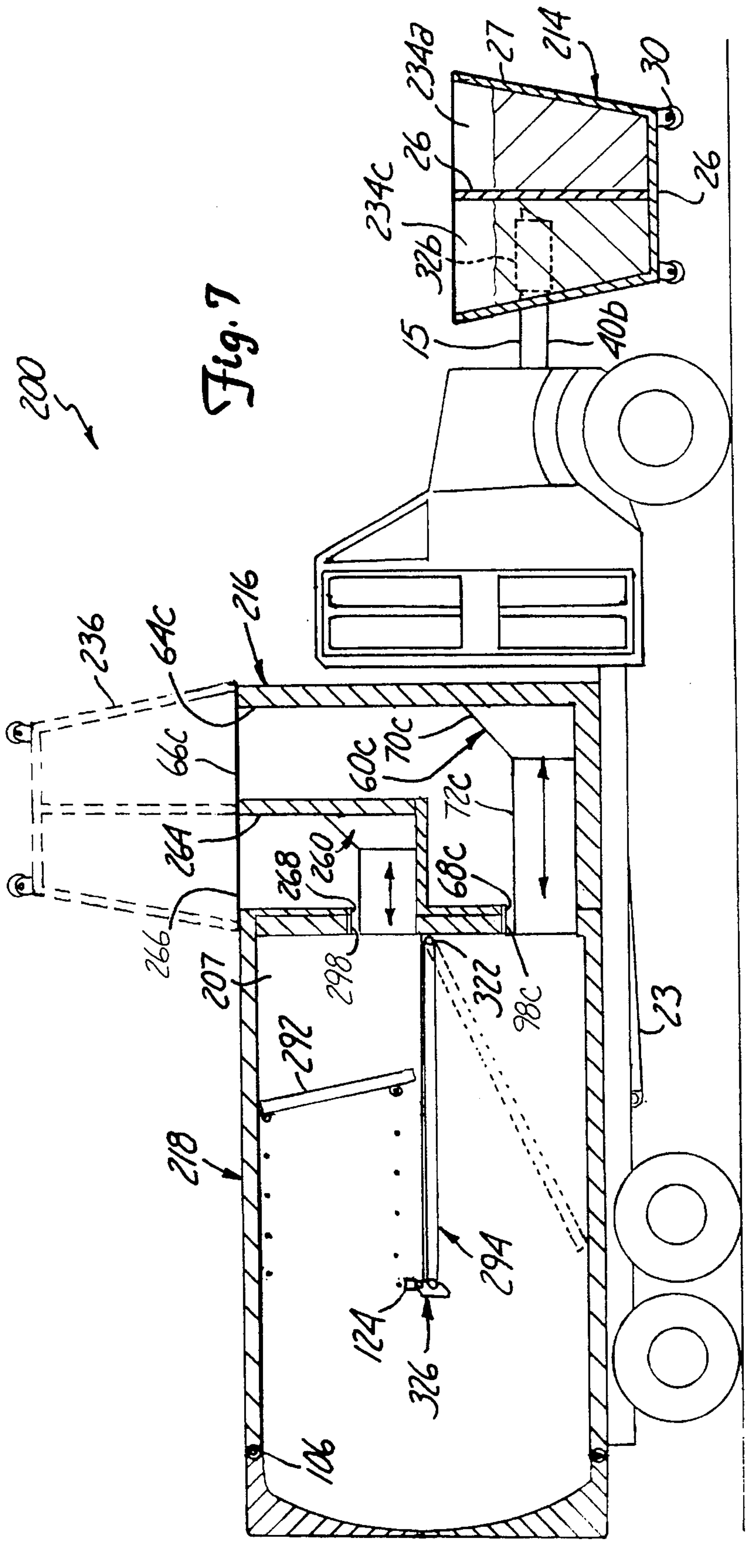
FIG. 7 is a side elevational view of an alternate embodiment of the inventive refuse collection vehicle, with portions shown in section.
Figure 8:
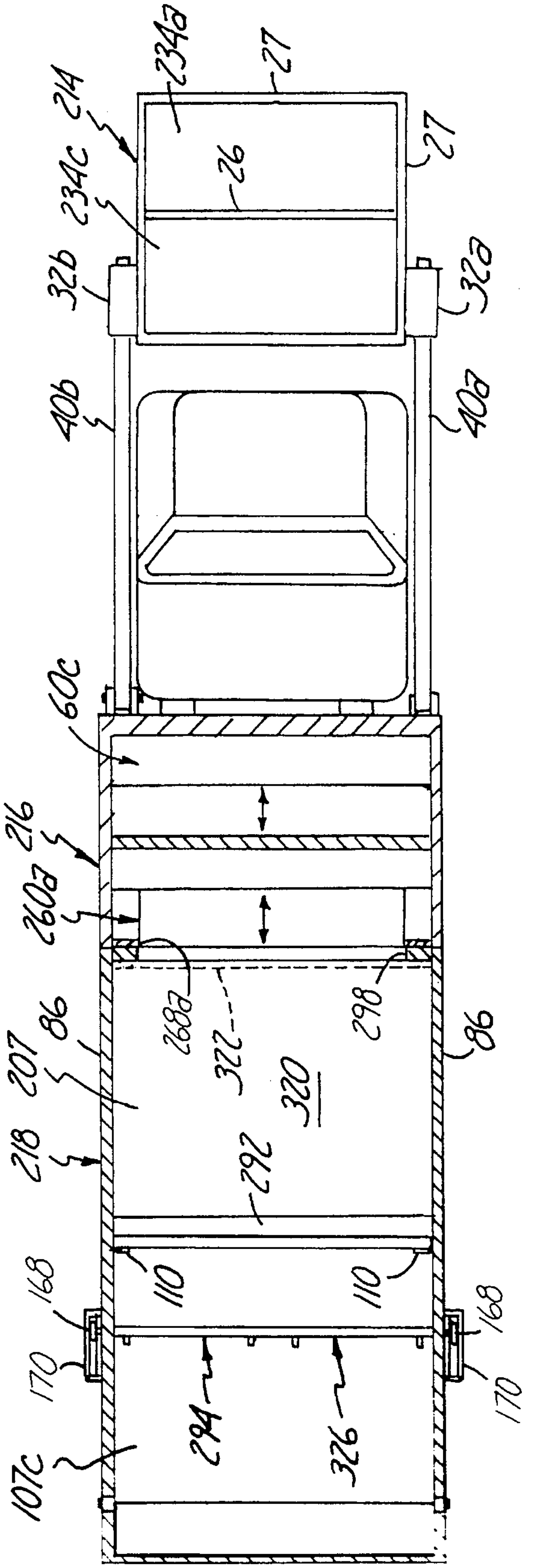
FIG. 8 is a top view of the refuse collection vehicle of FIG. 7, with portions shown in section.

FIGS. 7 and 8 illustrate an alternate embodiment (vehicle 200) of refuse collection vehicle 10 shown in FIGS. 1–6. FIGS. 7 and 8 illustrate a two compartment refuse collection vehicle 200. FIG. 7 shows a side sectional view of vehicle 200 while FIG. 8 shows a top sectional view of vehicle 200. Those elements of collection vehicle 200 which are the same as corresponding elements of collection vehicle 10 are numbered similarly. Refuse collection vehicle 200 is similar to refuse collection vehicle 10 except that loading bin 14 is replaced by loading bin 214, compactor 16 is replaced with compactor 216 and storage body 18 is replaced with storage body 218. Loading bin 214 is similar to loading bin 14 except that divider wall 29 of loading bin 214 is omitted. As a result, divider wall 26 divides the interior volume of loading bin 214 into front compartment 234*a* and rear compartment 234*c*. Each compartment may be used to carry refuse and recyclable commodities which must be separated. As can be appreciated, loading bin 214 may alternatively have a multitude of different configurations for containing several different commodities requiring separation. As shown by dashed lines 236, loading bin 214 is lifted by lifting apparatus 15 and emptied into compactor 216.

Compactor 216 is similar to compactor 16 of refuse collection vehicle 10 except that compactor 216 omits wall 58 and thereby includes only two distinct chutes 264 and 264. In addition, ram assemblies 60*a* and 60*b* of refuse collection vehicle 10 are replaced with ram assembly 260 and openings 66*a*, 66*b* and 68*a*, 68*b* are replaced with openings 266 and 268, respectively. Opening 266 extends between opposing side walls 86 (shown in FIG. 8). Similarly, opening 268 extends between opposing side walls 86 near a lower end of chute 264*a*. Ram assembly 260 is similar to ram assembly 60*a* except that ram assembly 260*a* extends between opposing side walls 86 as shown in FIG. 8. As a result, opening 266 and chute 264 provide a larger area through which material may be unloaded into compactors 16 from compartment 234*a* of loading bin 214. Commodities may then be pushed and compacted through opening 268*a* into an upper end of storage body 218. Chute 64*c* receives commodities from compartment 234*c*. Ram assembly 60*c* pushes and compacts commodities through opening 68*c* into storage body 218.

Storage body 218 is similar to storage body 18 except that storage body 218 includes a single opening 298 in lieu of side-by-side openings 98*a* and 98*b* in storage body 18. Storage body 218 also differs from storage body 18 in that storage body 218 does not include divider wall 90 and includes a single moveable bulkhead 292 and a single drop floor assembly 294.

Opening 298 extends substantially across storage body 218 between side walls 86 and is in communication with opening 268 of compactor 216. Opening 298 preferably is positioned above drop floor assembly 294 so that compactor 260 compacts material through openings 268 and 298 onto drop floor assembly 294.

Moveable bulkhead 292 is similar to moveable bulkheads 92*a* and 92*b* except that moveable bulkhead 292 extends substantially across storage body 218 between side walls 86. Positioning members 110 of moveable bulkhead 292 engage opposing side walls 86 of storage body 218 to releasably position moveable bulkhead 292 along storage body 218. Moveable bulkhead 292 is adjustable or walkable between the front and rear of storage body 218 similar to the adjusting of moveable bulkheads 92*a* and 92*b* as shown in FIG. 6. Consequently, moveable bulkhead 292 permits the volume of upper compartment 207 to be adjusted for containing various amounts of refuse and recyclable commodities.

Drop floor assembly 294 is similar to drop floor assemblies 94*a* and 94*b* except that drop floor assembly 294 includes a single floor panel 320, a single hinge 322 and a single hook latch 326. Floor panel 320 is similar to floor panels 120*a* and 120*b* except that floor panel 320 extends substantially between side walls 86 to provide a single intermediate floor. Hinge 322 is similar to hinges 122*a* and 122*b* except that hinge 322 extends substantially between side walls 86. Similarly, hook latch 326 is similar to hook latches 126*a* and 126*b* except that hook latch 326 extends substantially between side walls 86. Hook latch 326 preferably includes four hooks instead of two for more stably supporting floor panel 320. Hook latch 326 also includes two lever arms 168 and two lever guide and locks 170, each lever arm 168 and lever guide lock 170 extending through opposing side walls 86. As a result, hook latch 326 may be manually actuated for latching or releasing floor panel 320 from either side of storage body 218. Storage body 218 permits the volume of compartments 107*c* and 207 to be adjusted by moving moveable bulkhead 292 forward or rearward. Similar to storage body 18, storage body 218 allows the floor panel to be released to increase the volume of compartment 207 in communication with discharge opening 106. Consequently, refuse and recyclable commodities within compartment 207 are less compacted and are easier to unload. In addition, because floor panel 320 is vertically moveable, moveable bulkhead 292, once positioned, may be left in position and does not need to be taken out or moved to discharge commodities from compartment 207. As with drop floor assemblies 94*a* and 94*b*, drop floor assembly 294 may be dropped or released under the force of gravity and may also be raised for engagement with hook latch 326 by merely tipping or lifting storage body 218. Alternatively, floor panel 320 may be mechanically, hydraulically or pneumatically raised and lowered about hinge 322. In addition, the location of hinge 322 may also be varied. For example, floor panel 320 alternatively may be hinged to side walls 86 such that floor panel 320 falls or drops to positions adjacent and parallel to side walls 86. In lieu of hinge 322, storage body 218 may alternatively be provided with channels or grooves so that both opposing sides of floor panel 320 may be lowered while being guided within the channels or grooves.

Figure 9:
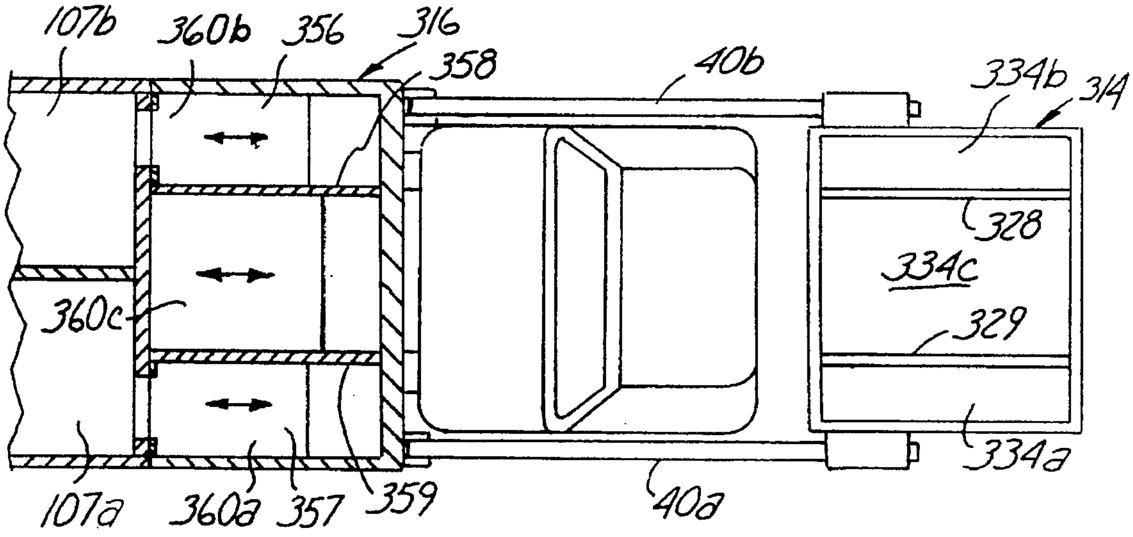
FIG. 9 is a schematic illustration of an alternate embodiment of the inventive storage body.

FIG. 9 illustrates an alternate preferred embodiment (bin 314 and compactor 316) of bin 14 and compactor 16 shown in FIGS. 1–8. Loading bin 314 is similar to bin 14 except that bin 314 includes two dividing walls 328 and 329 which define three distinct side-by-side compartments 334*a*, 334*b* and 334*c*. Each compartment 334 is sized and designed for the reception of garbage and recyclable materials which must be separated. Preferably, compartment 334*c*, which is for the reception of generally non-recyclable garbage, occupies a larger portion of bin 314. Compartments 334*a* and 334*b* divide the remainder of bin 314 for the reception of paper and glass or plastic material, respectively.

Compactor 316 is similar to compactor 16 except that compactor 316 includes upper chute floors 356, 357 and intermediate chute walls 358, 359. Chute floors 357 and 358 extend from the front of compactor 316 to the rear of compactor 316 along the sides of compactor 316. Chute walls 358, 359 vertically extend between the roof of compactor 316 to floors 356, 357, respectively. Floors 356, 357 and walls 358, 359 divide compactor 316 into three distinct side-by-side chutes, upper right chute 360*a*, upper left chute 360*b* and central lower chute 360*c*. Chutes 360*a*, 360*b* and 360*c* are preferably in alignment with compartments 334*a*, 334*b* and 334*c*, respectively, of bin 314. As a result, separated garbage within compartments 334 of loading bin 314 may be emptied into the separate chutes 360 of compactor 316 without the materials commingling with one another. Similar to compactor 16, materials within chutes 360*a*, 360*b* and 360*c* are compacted into compartments 107*a*, 107*b* and 107*c* of storage body 18.

Figure 10:
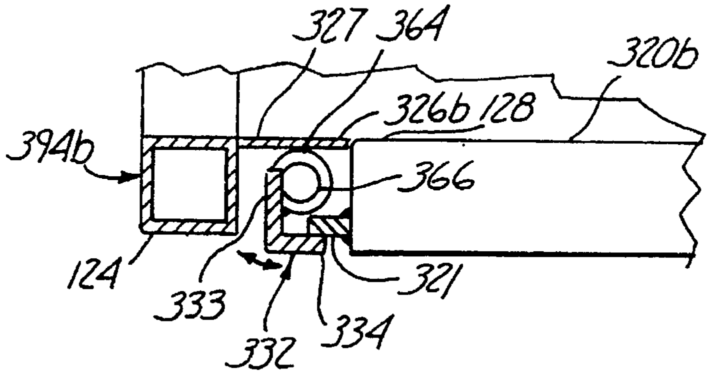
FIG. 10 is a schematic illustration of an alternate embodiment of the inventive storage body.

FIG. 10 illustrates an alternative embodiment (drop floor assembly 394*b*) of drop floor assembly 94*b* shown in FIG. 4. For ease of illustration, those elements of drop floor assembly 394*b* which are the same as those elements of drop floor assembly 94*b* are numbered the same. Drop floor assembly 394*b* includes floor panel 320*b* and hook latch 320*b*. Floor panel 320*b* is similar to floor panel 120*b* except that edge portion 128 of floor panel 320*b* includes lip member 321. Lip member 321 preferably comprises a steel bar welded to a lower end of edge portion 128. Lip 321 protrudes from edge portion 128 for being engaged by hook latch 320*b*.

Hook latch 326*b* is similar to hook latch 126*b* except that hook latch 326*b* includes cover plate 327, guide tube 364, latch shaft 366 and hooks 332. Cover plate 327 is a flat steel bar preferably welded to support tube 124 so as to horizontally project away from support tube 124 towards floor panel 320*b*. Preferably, cover plate 327 extends into close tolerance with floor panel 320*b* at substantially the same horizontal level as the upper surface of floor panel 320*b*. Cover plate 327 supports guide tube 364, latch shaft 366 and hooks 332. Cover plate 327 prevents commodities or refuse from being deposited upon and building up on hooks 332 which would otherwise interfere with the functioning of hook latch 326*b*. At the same time, cover plate 327 does not interfere with commodities from being moved across tube 124 onto floor panel 320*b* when the movable bulkhead is slid forward.

Guide tube 364 is similar to guide tube 164 shown in FIG. 4. Guide tube 364 is fixedly coupled to a lower surface of cover plate 327. Guide tube 364 supports latch shaft 366 and guides the rotation of latch shaft 366. Latch shaft 366 is substantially similar to latch shaft 166 shown in FIG. 4. Latch shaft 366 extends through guide tube 364 and rotatably supports hook 332.

Each hook 332 generally comprises an L-shaped member having a substantially vertical portion 333 and a substantially horizontal portion 334. Vertical portion 333 is mounted to latch shaft 366 while horizontal portion 334 horizontally extends from vertical portion 333 towards floor panel 320*b*. Horizontal portion 334 has a width so as to engage lip member 321 of floor panel 320*b*. As a result, rotation of latch shaft 366 rotates horizontal portion 334 of each hook 332 in and out of engagement with lip 321 of floor panel 320*b* to support floor panel 320*b* in a raised position or to permit floor panel 320*b* to be lowered. Moreover, because hooks 332 are formed from L-shaped members, hooks 332 more easily engage floor panel 320*b*.

Figure 11:
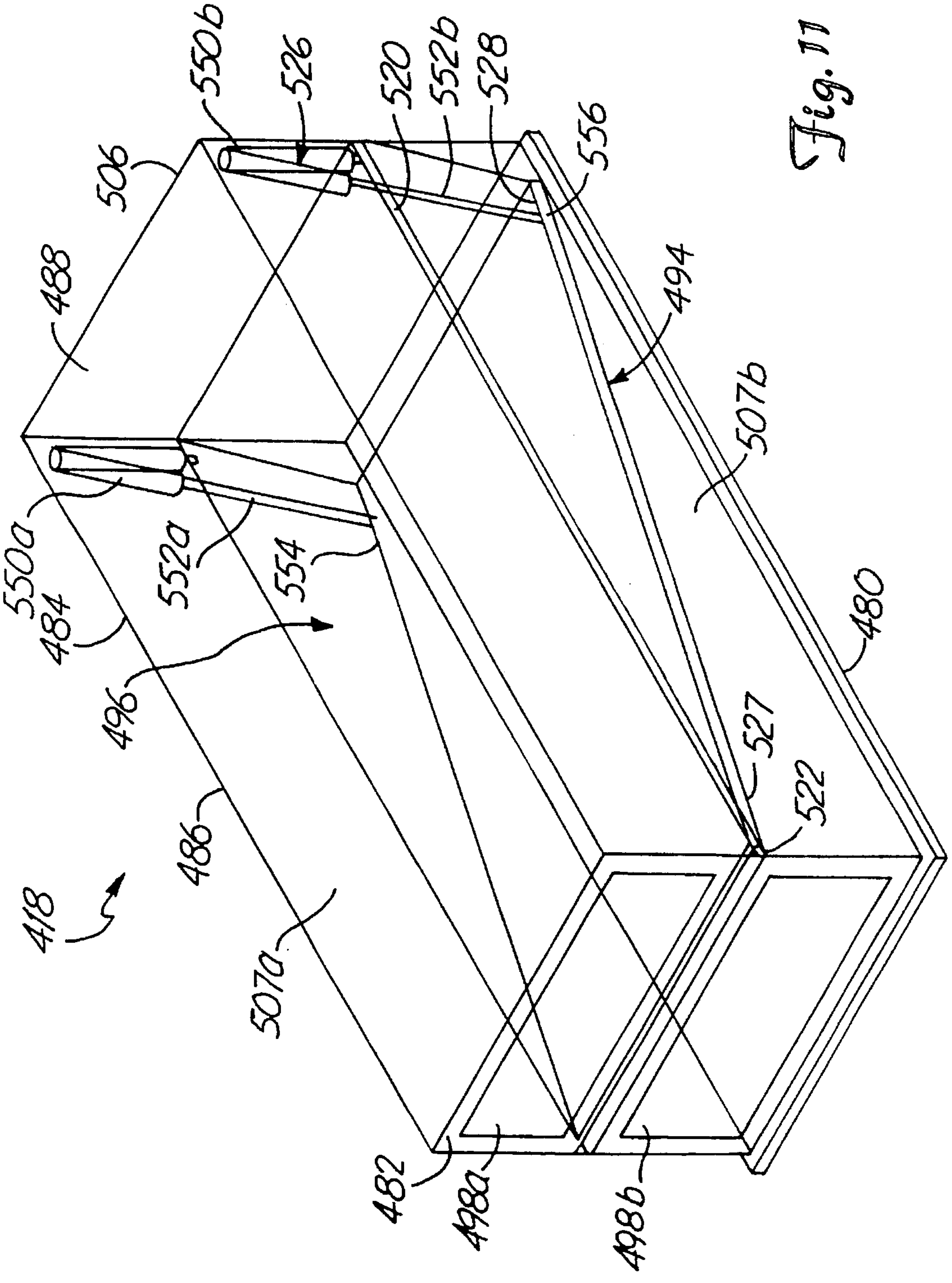
FIG. 11 is a schematic illustration of an alternate embodiment of the inventive storage body.

FIGS. 11–14 schematically illustrate alternative embodiments of storage body 18. For ease of illustration, those elements in FIGS. 11–14 which are the same are numbered similarly. FIG. 11 shows a schematic view of storage body 418, which is designed for being mounted upon a frame adjacent to a compactor and includes floor 480, front wall 482, roof 484, side wall 486, tail gate assembly 488 and drop floor assembly 494. Floor 480, front wall 482, roof 484, side wall 486 and tail gate assembly 488 define interior storage space 496. Front wall 482 includes openings 498*a* and 498*b*. Openings 498*a* and 498*b* are positioned for receiving refuse and recyclable commodities from a compactor (not shown). Tail gate assembly 488 encloses the rear portion of interior storage space 496 to retain waste and recyclable commodities within interior storage space 496. Tail gate assembly 488 further defines a discharge opening 506 through which commodities may be emptied from interior storage space 496.

Drop floor assembly 494 includes floor panel 520, hinge 522, and lifting mechanism 526. Floor panel 496 extends between side walls 486 from front wall 482 to the rear wall or tail gate assembly 488. Floor panel 520 divides interior storage space 496 into an upper compartment 507*a* and a lower compartment 507*b*. Floor panel 520 has opposing edge portions 527 and 528 and opposing edge portions 554, 556. Opposing edge portion 527 is preferably hinged to front wall 482 by hinge 522. Opposing edge portion 528 is preferably coupled to lifting mechanism 526.

Lifting mechanism 526 is preferably a hydraulic or pneumatic piston cylinder assembly and includes cylinder assemblies 550*a*, 550*b* and a pistons 552*a*, 552*b*. Cylinder assemblies 550*a*, 550*b* are coupled to side walls 486. Pistons 552*a*, 552*b* extend from cylinder assemblies 550*a*, 550*b* and are coupled to edge portions 554, 556, respectively, of floor panel 494 near edge portion 528. Actuation of pistons 552 raises and lowers floor panel 494 to decrease or increase the volume of compartment 507*a* in communication with discharge opening 506. As a result, refuse and commodities within compartment 507 are less compacted and are easier to unload. Moreover, because floor panel 494 extends from wall 482 to the rear wall or tail gate assembly 488, compartment 507*a* has a larger volume for containing selected commodities. As can be appreciated, lifting mechanism 526 may alternatively comprise hook latches as shown in FIGS. 1 and 2.

Figure 12:
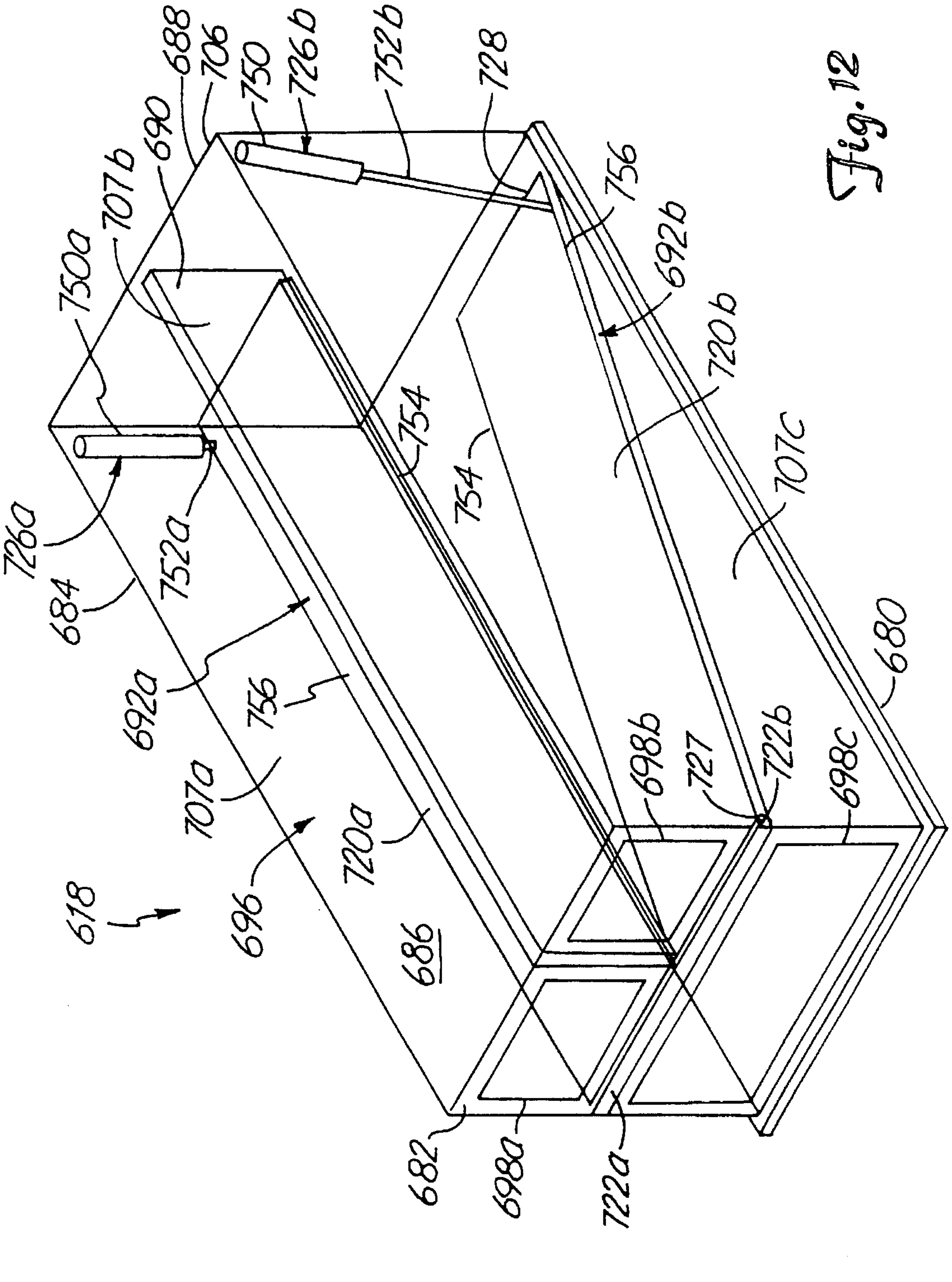
FIG. 12 is a schematic illustration of an alternate embodiment of the inventive storage body.

FIG. 12 shows a schematic view of storage body 618, which is designed for being mounted upon a frame adjacent to a compactor and includes floor 680, front wall 682, roof 684, side walls 686, tail gate assembly 688, intermediate dividing wall 690 and drop floor assemblies 692*a* and 692*b*. Floor 680, front wall 682, roof 684, side walls 686 and tail gate assembly 688 define an interior storage space 696 of storage body 618. Front wall 682 includes opening 698*a*, opening 698*b* and lower opening 698*c*. Openings 698*a*, 698*b* and 698*c* are in communication with a compactor (not shown) so that storage body 618 may receive refuse and recycled commodities through openings 698. Preferably, openings 698 are aligned with openings within the compactor so that ram assemblies (not shown) may push and compact waste and recyclables through openings 698 into interior storage space 696. Tail gate assembly 688 serves as a rear wall for enclosing the rear portion of interior storage space 696 to retain refuse and recyclable commodities within storage body 618. Tail gate assembly 688 is preferably openable so as to define a discharge opening 706 through which commodities may be emptied from interior storage space 696.

Intermediate dividing wall 690 extends downward from roof 684 and rearward from front wall 682 to divide upper portions of storage space 696 into left and right halves. Dividing wall 690 preferably extends from front wall 682 to tail gate assembly 688 where discharge opening 706 is defined. Intermediate dividing wall 690, and drop floor assemblies **694*a* and 694*b* divide storage space 696 into three separate and distinct compartments 707*a*, 707*b* and 707*c*. As a result, each compartment may be used to contain and separate different commodities. Dividing wall 690 is preferably positioned between openings 698*a* and 698*b***.

Drop floor assemblies **692*a* and 692*b* are preferably positioned on opposite sides of divider wall 690 and include floor panels 720*a*, 720*b*, hinges 722*a*, 722*b* and lifting mechanisms 726*a*, 726*b*. Floor panels 720*a*, 720*b* and hinges 722*a*, 722*b* are similar to floor panels 120*a*, 120*b* and hinges 122*a* and 122*b* of storage body 18 except that floor panels 720*a*, 720*b* extend from front wall 682 towards tail gate assembly 688 substantially along the entire length of storage body 618. Consequently, compartments 707*a* and 707*b* are larger and are capable of containing a larger quantity of refuse and recyclable commodities. Floor panels 720*a* and 720*b* each include opposing edge portions 727, 728 and opposing edge portions 754, 756. Opposing edge portions 727 of each floor panel 720*a*, 720*b* is hinged to front wall 682 by hinges 722*a*, 722*b*, respectively. Opposing edge portion 728 of each floor panel 720*a*, 720*b* is coupled to lifting mechanisms 726*a*, 726*b*, respectively. As a result, floor panels 720*a*, 720*b* may be pivoted about hinges 722*a*, 722*b* to be vertically moved so as to increase volume of compartments 707*a*, 707*b* in communication with discharge opening 706**.

Lifting mechanisms **726*a*, 726*b* are preferably hydraulic or pneumatic piston-cylinder assemblies which include cylinders 750*a*, 750*b* and pistons 752*a*, 752*b*. Cylinders 750*a*, 750*b* are preferably coupled to side walls 686 while pistons 752*a*, 752*b* are coupled to edge portions 756 near edge portion 728. Selective actuation of pistons 752 permits floor panels 720*a*, 720*b* to be raised and lowered. As can be appreciated, lifting mechanism 726*a*, 726*b* may alternatively include hook latches 126 of storage body 18. Because the volume of compartment 707*a*, 707*b* in communication with discharge opening 706 may be increased, refuse and recyclable commodities within compartment 707*a*, 707*b* are less compacted and are easier to unload. Storage body 618** provides three distinct separate compartments wherein the upper compartments have a larger capacity for adequately storing and containing refuse.

Figure 13:
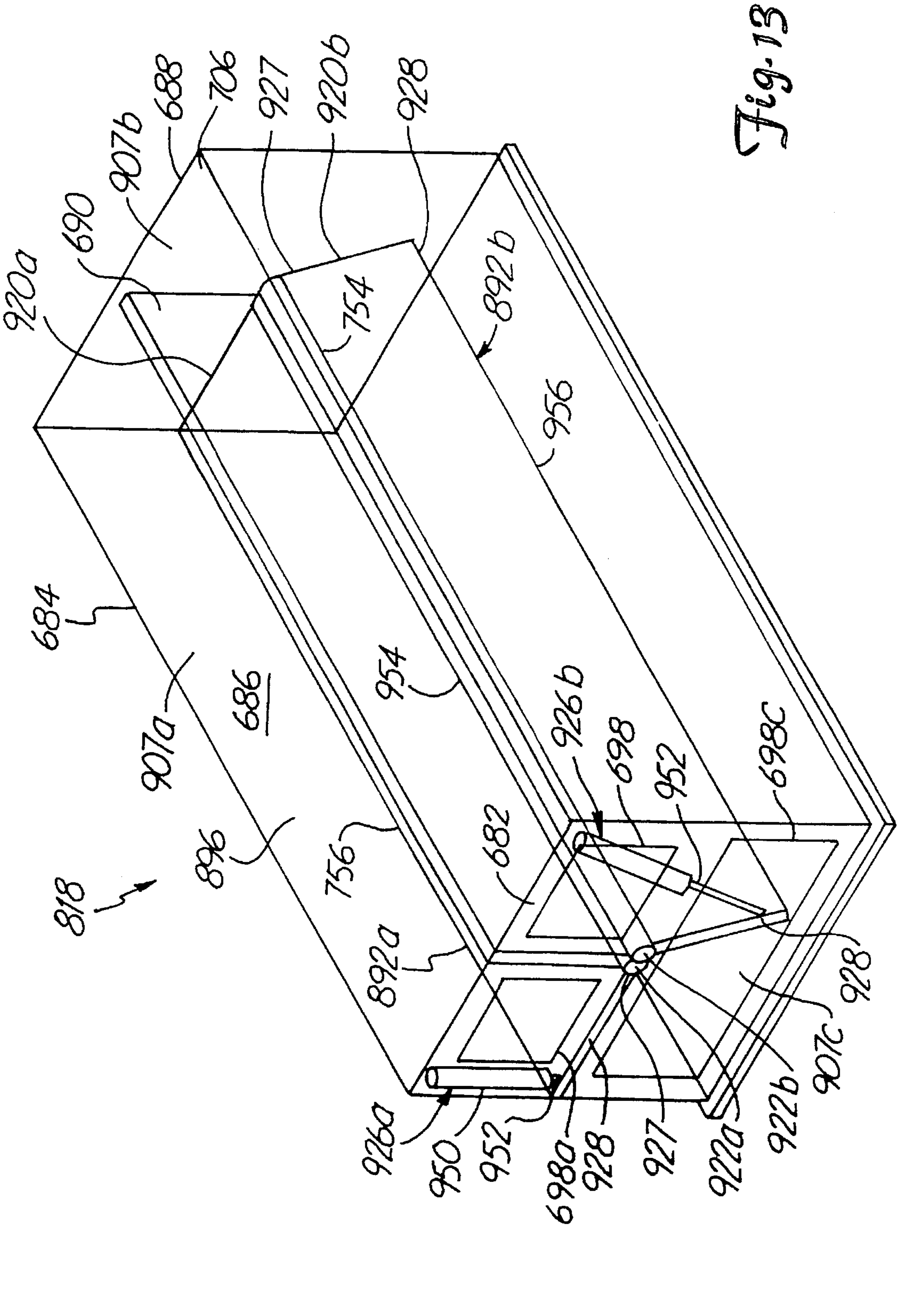
FIG. 13 is a schematic illustration of an alternate embodiment of the inventive storage body.

FIG. 13 schematically illustrates an alternate embodiment (storage body 818) of storage body 618 shown in FIG. 12. For ease of illustration, those elements of storage body 618 which are the same as corresponding elements of storage body 618 are numbered similarly. Storage body 818 is similar to storage body 618 except that storage body 818 includes drop floor assembly **892*a*, 892*b* in place of drop floor assemblies 692*a*, 692*b*, respectively. Drop floor assembly 892*a*, 892*b* are preferably positioned on opposite sides of divider wall 690 and include floor panels 920*a*, 920*b*, hinges 922*a*, 922*b* and lifting mechanisms 926*a*, 926*b*. Floor panels 920*a*, 920*b* include opposing edge portions 927 and 928 and opposing edge portions 954, 956. Edge portion 954 of each panel 920*a*, 920*b* is pivotally coupled to intermediate wall 690 by hinges 922*a*, 922*b*, respectively. Edge portion 956 of each floor panel 920*a*, 920*b* is located opposite edge portion 954 and pivots between a raised position and a lowered position. As shown in FIG. 13, floor panel 920*a* is in a raised position while floor 920*b* is in a lowered position. In a raised position, floor panels 920*a*, 920*b* and intermediate wall 690 divide interior storage space 996 into three distinct compartments 907*a*, 907*b* and 907*c*. When both floor panels 920*a*, 920*b* are lowered, interior storage space 896 is divided into two compartments, a left compartment and a right compartment. Consequently, storage body 818 may be used to provide both a three compartment storage body or a two compartment storage body. Moreover, because floor panels 920*a*, 920*b* are both vertically adjustable, the volume of compartments 907*a*, 907*b* in communication with discharge opening 706 may be increased so that waste and recyclable commodities within the compartments are less compacted and are easier to unload. Because floor panels 920*a*, 920*b* extend from front wall 682 towards tail gate assembly 688 substantially along the entire length of storage body 818, the capacity or volume of compartments 907*a*, 907*b*** is large enough to receive a substantial amount of refuse or recyclable commodities.

Lifting mechanisms **926*a*, 926*b* are identical to lifting mechanisms 926*a*, 926*b* shown in FIG. 12 and include cylinder assemblies 950*a*, 950*b* and in pistons 952*a*, 952*b*. Each cylinder assembly 950*a*, 950*b* is preferably coupled to front wall 682. Alternatively, cylinder assemblies 950*a*, 950*b* may be coupled to side walls 686. Each piston 952 extends from cylinder assembly 850 and has one end coupled to edge portion 956 near edge portion 928 of floor panels 920*a*, 920*b*. Hydraulic or pneumatic actuation of piston 952 raises and lowers floor panel 920*a*, 920*b* as desired. Alternatively, lifting mechanisms 926*a*, 926*b* may include hook latches 126*a*, 126*b* as shown in FIGS. 1–6**.

Figure 14:
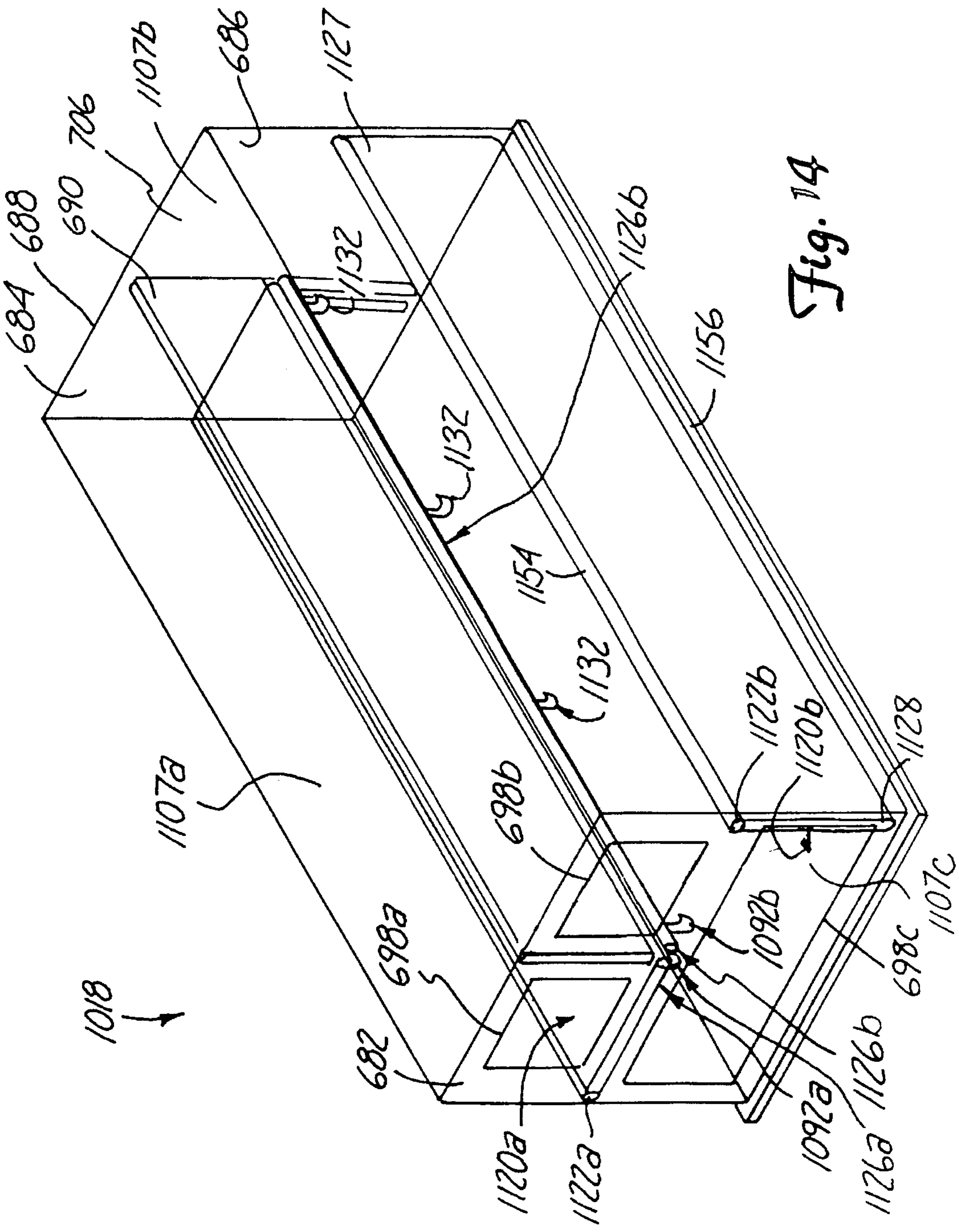
FIG. 14 is a schematic illustration of an alternate embodiment of the inventive storage body.

FIG. 14 schematically shows another alternate embodiment (storage body 1018) of storage body 618 shown in FIG. 12. For ease of illustration, those elements of storage body 1018 which are the same as those elements of storage body 618 are numbered similarly. Storage body 1018 is similar to storage body 618 except that storage body 1018 includes drop floor assemblies **1092*a*, 1092*b* in place of drop floor assemblies 692*a*, 692*b*. Drop floor assemblies 1092*a*, 1092*b* include floor panels 1120*a*, 1120*b*, hinges 1122*a*, 1122*b* and hook latches 1126*a*, 1126*b*. Floor panels 1120*a*, 1120*b* each include opposing edge portions 1127, 1128 and opposing edge portions 1154, 1156. Edge portion 1154 of each floor panel 1120*a*, 1120*b* is pivotally coupled to side wall 686 by hinges 1122*a*, 1122*b*, respectively. As a result, edge portion 1156 may be raised and lowered. In a raised position, each floor panel 1120*a*, 1120*b* divides interior storage space 1096 into three compartments 1107*a*, 1107*b*, and 1107*c*. In a lowered position, edge portion 1156 is positioned adjacent side walls 686. Consequently, when both floor panels 1120*a*, 1120*b* are in a lowered position, interior storage space 1096 is a single unpartitioned compartment. Moreover, because floor panels 1120*a*, 1120*b* each preferably have a width between edge portions 1154 and 1156 less than or equal to the height at which floor panels 1120*a*, 1120*b* are pivotally coupled to side walls 686, edge portion 1156 may be pivoted into abutment against side walls 686 and does not substantially project into compartment 1107*c* to interfere with unloading or compaction of materials within compartment 1107***c*. In addition, lowering either one or both of floor panels 1127*a*, 1127*b* increases the volume of either or both compartments 1107*a*, 1107*b* in communication with discharge opening 706. For example, lowering floor panel 1120*b* (as shown in FIG. 12) allows refuse and recyclable commodities compacted within compartment 1107*b* to fall down into compartment 1107*c* and become less compacted. Consequently, unloading is easier.

Hook latches 1126*a*, 1126*b* are similar to hook latches 126*a*, 126*b* shown in FIGS. 1–6 except that hook latches 1126*a*, 1126*b* extend between front wall 682 and tail gate assembly 688 adjacent to divider wall 690. Preferably, each hook latch 1126*a*, 1126*b* is coupled to a lower end of divider wall 690. Similar to hook latches 126, hook latches 1126*a*, 1126*b* each include hooks 1132 which releasably engage edge portions 1156 of floor panels 1120*a*, 1120*b* to hold floor panels 1120*a*, 1120*b* in a raised position. Hooks 1132 may be rotated by a lever arm (not shown) to release edge portion 1156 of floor panel 1120*a*, 1120*b* to allow floor panels 1120*b* to fall due to the force of gravity into a lowered position floor panel 1120*b* is shown in a lowered position in FIG. 12. Tipping of storage body 1018 permits floor panels 1120*a*, 1120*b* to be easily rotated once again into the raised position at which point hook latches 1126*a*, 1126*b* may be once again rotated to releasably secure the floor panels in the raised position.

In conclusion, the multiple compartment storage body of the present invention provides a multiplicity of compartments for containing refuse and recyclable commodities which may require separation. Each compartment has a volume which may be increased or decreased to provide variable capacities for containing refuse and recyclable commodities. Because the movable bulkheads are supported independently from the floors of the upper compartments, the floors are vertically movable and the movable bulkheads do not require complex guiding and positioning structures. Because the floors of the upper compartments may be vertically raised and lowered, the volume of the upper compartments in communication with the discharge opening may be increased to uncompact commodities contained within the upper compartments. Furthermore, because the floors of the upper compartments are themselves vertically movable, the movable bulkheads between the compartments and the discharge opening do not need to be moved or repositioned for unloading. Consequently, unloading refuse and recyclable commodities from the storage body of the present invention is easier. Because the floors of the upper compartments are preferably hinged at one end to the storage body and releasably supported in a raised position, the floors may be easily raised and lowered utilizing the force of gravity. Thus, space consuming and expensive lifting mechanisms are not necessary. In sum, the storage body of the present invention permits refuse and recyclable commodities to be more easily collected, transported and discharged.

Although the present invention has been described with reference to preferred embodiments, workers skilled in the art will recognize that changes may be made in form and detail without departing from the spirit and scope of the invention.

What is claimed is:

1. A multiple compartment storage body for a refuse collection vehicle, the body comprising: a floor; a roof;

a plurality of walls extending between the floor and the roof, the plurality of walls including a front wall, a rear wall, and side walls between the front wall and the rear wall, wherein the roof, floor and walls define an interior storage space and wherein the walls define a discharge opening; and a vertically movable partition supported adjacent to and extending from the front wall towards the rear wall and positioned between the floor and the roof, wherein the partition divides the interior storage space into an upper compartment having a volume and a lower compartment having a volume and wherein the entire partition is vertically movable between a first raised position intermediate the floor and the roof and a second lowered position so as to increase the volume of one of the upper and lower compartments in communication with the discharge opening and to allow refuse near the front wall in one of the Upper and lower compartments to become less compact for unloading.

2. The storage body of claim 1 wherein the partition includes:

first and second opposing edge portions, wherein the first edge portion has a length pivotally supported adjacent to and along a wall to allow the second edge portion to be pivoted between a first raised position wherein the partition separates the upper compartment from the lower compartment, and a second lowered position to increase the volume of one of the upper and lower compartments in communication with the discharge opening; and means for releasably supporting the second edge portion at the first raised position.

3. The storage body of claim 2 wherein the means for releasably supporting includes:

at least one hook movable between a first engaged position and a second disengaged position, wherein the hook engages the second edge portion in the first engaged position to support the second edge portion at the first raised position and wherein the hook is disengaged from the second edge portion in the second disengaged position to allow the second edge portion to be moved into the second lowered position.

4. The storage body of claim 3 wherein the hook supports an upper surface of the partition at a substantially horizontal level and wherein the storage body further includes:

a flat cover plate permanently supported above each hook proximate the second edge portion in vertical alignment with the upper surface of the partition so that the cover plate prevents refuse from being deposited upon each hook and allows refuse to be moved above and across the hook.

5. The storage body of claim 1 wherein the partition includes a forward edge portion and a rearward edge portion, and wherein the forward edge portion has a length pivotally supported adjacent to and along portion to be raised and lowered to increase the volume of one of the upper and lower compartments in communication with the discharge opening.

6. The storage body of claim 1 wherein the partition includes:

first and second opposing edge portions extending parallel to the side walls, wherein the first edge portion has a length pivotally coupled adjacent to and along one of the side walls to allow the second edge portion to be pivoted between a first raised position above the floor and a second lowered position adjacent the floor to increase the volume of one of the upper and lower compartments in communication with the discharge opening.

7. The storage body of claim 1 wherein the partition includes:

first and second opposing edge portions, wherein the first edge portion has a length pivotally coupled adjacent to and along one of the side walls at a height above the floor and wherein the partition has a width between the first edge portion and the second edge portion less than or equal to the height so that the second end portion may be pivoted between a first raised position intermediate the floor and the roof and a second lowered position substantially in abutment against one of the side walls.

8. The storage body of claim 1 wherein the partition includes:

a plurality of members, each member having first and second opposing edge portions, each first edge portion having a length being pivotally coupled adjacent to and along one of the walls so that the second edge portion may be pivoted into adjacent relationship with another second edge portion to form a composite partitioning platform.

9. The storage body of claim 1 including:

a movable bulkhead extending between the walls and positioned between the partition and the roof to define the upper compartment; and means for releasably coupling the movable bulkhead to the side walls at a plurality of selected positions so that the side walls independently support the movable bulkhead above the partition.

10. The storage body of claim 9 wherein the means for releasably coupling includes:

top rows of spaced aligned detents extending into opposing side walls;

bottom rows of spaced aligned detents extending into opposing walls, wherein the bottom rows of spaced detents are offset from the top rows of spaced detents; and top and bottom pinning members coupled to top and bottom portions of the movable bulkhead for releasably and pivotally engaging the top and bottom rows of spaced detents, respectively, so that the top and bottom portions of the movable bulkhead may be alternately disengaged from the opposing walls and pivoted about the pinning members to walk the movable bulkhead between and along the walls at selected locations along the walls.

11. The storage body of claim 9 wherein the means for releasably coupling includes:

a first pair of rows of spaced coupling members for releasably and pivotally coupling opposite end portions of the movable bulkhead to at least one of the walls, wherein the coupling members of each row are in alignment with one another; and a second pair of rows of spaced coupling members for releasably and pivotally coupling opposite end portions of the movable bulkhead to at least one of the walls, wherein the coupling members of each row are in alignment with one another, and wherein the coupling members of the second pair of rows are offset from the coupling members of the first pair of rows so that opposite end portions of the movable bulkhead may be alternately uncoupled from at least one of the walls and pivoted about the coupling members to walk the movable bulkhead between and along the walls at selected locations.

12. The storage body of claim 1 including:

an intermediate wall partially extending between the floor and the roof and positioned between the walls to divide the interior storage space into side compartments.

13. The storage body of claim 12 wherein the partition includes:

first and second opposing edge portions, wherein the first edge portion has a length pivotally coupled adjacent to and along the intermediate wall to allow the second edge portion to be pivoted to increase the volume of one of the upper and lower compartments in communication with the discharge opening.

14. The storage body of claim 1 including:

a bulkhead extending between the walls and positioned between the partition and the roof to define the upper compartment, wherein a bottom portion of the bulkhead extends away from the front wall so that the upper compartment is wedge-shaped for relieving compaction pressure during unloading.

15. A multiple compartment storage body for a refuse collection vehicle, the body comprising:

a floor;

a roof;

a plurality of vertical walls between the floor and the roof, wherein the vertical walls define a discharge opening and at least one storage compartment in communication with the discharge opening; and a vertically movable partition between the floor and the roof for defining at least one upper storage compartment and at least one lower storage compartment, each storage compartment having volume, wherein substantially the entire partition is vertically movable and includes first and second opposing edge portions, the first opposing edge portion having a length about which the partition is pivotally supported adjacent to and along one of the vertical walls to allow the second opposing edge portion to be pivoted to increase the volume of at least one of the upper and lower storage compartments towards the second opposing edge portion.

16. The storage body of claim 15 wherein the plurality of vertical walls includes an intermediate bulkhead partially extending between the floor and the roof, wherein the first edge portion of the partition has a length pivotally supported adjacent to and along the bulkhead to allow the second opposing edge portion to be pivoted.

17. The storage body of claim 15 wherein the plurality of vertical walls includes a front wall, a rear wall, and side walls between the front wall and the rear wall, and wherein the first opposing edge portion of the partition has a length pivotally supported adjacent to and along the front wall to allow the second opposing edge portion to be pivoted.

18. The storage body of claim 15 wherein the plurality of vertical walls includes a front wall, a rear wall, and side walls between the front wall and the rear wall, and wherein the first opposing edge portion of the partition has a length pivotally supported adjacent to and along one of the side walls to allow the second opposing edge portion to be pivoted.

19. A method for discharging refuse from a refuse collection vehicle having an upper storage compartment and a lower storage compartment separated by a partition extending from a front of the storage compartment to a rear of the storage compartment, wherein the lower storage compartment is in communication with a discharge opening, the method comprising:

discharging refuse from the lower storage compartment out the discharge opening; moving the entire partition to increase a volume of one of the upper and lower storage compartments in communication with the discharge opening and to allow refuse adjacent the front of the storage compartment within one of the upper and lower storage compartments to expand and to become less compact for unloading; and discharging refuse from the upper storage compartment out the discharge opening.

20. The method of claim 19 wherein the refuse collection vehicle has a roof, a floor, and vertical walls positioned between the roof and the floor and wherein the partition is pivotally coupled to one of the vertical walls, wherein lowering the partition includes pivoting the partition.

21. A method for discharging refuse from a refuse collection vehicle having a storage body with a floor, a roof, vertical walls positioned between the floor and the roof, and a partition hinged adjacent to and along one of the vertical walls so as to separate an upper storage compartment and a lower storage compartment, wherein the lower storage compartment is in communication with a discharge opening, the method comprising:

unloading refuse from the lower storage compartment out the discharge opening;

pivoting the entire partition to increase a volume of the upper storage compartment in communication with the discharge opening; and unloading refuse from the upper storage compartment out the discharge opening.

22. The method of claim 21 further including:

tipping the storage body towards the discharge opening to unload refuse out the discharge opening.

23. The method of claim 21 wherein the partition has first and second opposing edge portions, wherein the first edge portion is pivotally coupled to one of the vertical walls to allow the second edge portion to be pivoted between a first raised position and a second lowered position, wherein the second edge portion is releasably supported in the first raised position to separate the upper storage compartment and the lower storage compartment, and wherein the unloading refuse from the upper storage compartment includes:

releasing the second edge portion of the partition to allow the second edge portion to fall to the second lowered position;

tipping the storage body towards the discharge opening so that refuse within the upper storage compartment moves towards the discharge opening aided by the force of gravity; and further tipping the storage body after refuse has been unloaded from the upper storage compartment so that the second edge portion swings towards the first raised position by the force of gravity.

24. A multiple compartment storage body for a refuse collection vehicle, the body comprising:

a floor;

a roof;

a plurality of walls extending between the floor and the roof, the plurality of walls including a front wall, a rear wall, and side walls between the front wall and the rear wall, wherein the roof, floor and walls define an interior storage space and wherein the walls define a discharge opening;

a lower compartment within the interior storage space, the lower compartment having a volume in communication with the discharge opening; and an upper compartment having a volume and positioned within the interior storage space above the lower compartment, the upper compartment including:

at least one vertical bulkhead between the discharge opening and the volume defined by the upper compartment; and a vertically movable partition extending below at least one said vertical bulkhead between the upper compartment and the lower compartment to separate the upper compartment from the lower compartment, wherein at least a portion of the partition is vertically movable between a first position and a second position, wherein the partition provides a floor for the upper compartment in the first position and wherein the partition permits refuse contained within the upper compartment to fall into the lower compartment when at least a said portion of the partition is in the second position so that the refuse may be further discharged out the discharge opening.

25. The storage body of claim 24 wherein the bulkhead is movable as to increase and decrease the volume of the upper compartment.

26. A method for discharging refuse from a refuse collection vehicle having a floor, a roof, walls between the floor and the roof which define a discharge opening, an upper storage compartment and a lower storage compartment separated by a vertically movable partition which provides a floor for substantially the entire upper storage compartment, and a substantially vertical baffle extending from the partition to the roof, the lower storage compartment in communication with the discharge opening, the method comprising:

unloading refuse from the lower storage compartment out the discharge opening;

lowering the vertically movable partition to permit refuse contained within the upper storage compartment to fall into the lower storage compartment so that the refuse may be further unloaded out the discharge opening; and unloading the fallen refuse from the upper storage compartment out the discharge opening.

27. A method for discharging refuse from a refuse collection vehicle having a floor, a roof, a plurality of walls between the floor and the roof, a discharge opening defined by the walls, and an upper compartment and a lower compartment separated by a straight integral partition extending from the wall opposite the discharge opening towards the discharge opening, the method comprising:

discharging refuse from one of the upper and lower compartments;

moving the entire partition to increase a volume of one of the upper and lower compartments in communication with the discharge opening and to allow refuse adjacent the wall opposite the discharge opening within one of the upper and lower compartments to expand and to become loosened for unloading; and discharging refuse from the other one of the upper and lower compartments.

* * * * *